United States Patent
Takabayashi

(10) Patent No.: US 10,071,587 B2
(45) Date of Patent: Sep. 11, 2018

(54) IMAGE FORMING METHOD

(71) Applicant: Konica Minolta, Inc., Tokyo (JP)

(72) Inventor: Toshiyuki Takabayashi, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/118,363

(22) PCT Filed: Mar. 6, 2015

(86) PCT No.: PCT/JP2015/056650
§ 371 (c)(1),
(2) Date: Aug. 11, 2016

(87) PCT Pub. No.: WO2015/133605
PCT Pub. Date: Sep. 11, 2015

(65) Prior Publication Data
US 2017/0165994 A1 Jun. 15, 2017

(30) Foreign Application Priority Data
Mar. 7, 2014 (JP) ................... 2014-045293

(51) Int. Cl.
| | | |
|---|---|---|
| *G01D 11/00* | (2006.01) | |
| *B41M 7/00* | (2006.01) | |
| *B41J 11/00* | (2006.01) | |
| *B41J 2/01* | (2006.01) | |
| *B41M 5/00* | (2006.01) | |
| *C09D 11/101* | (2014.01) | |

(Continued)

(52) U.S. Cl.
CPC .............. *B41M 7/0081* (2013.01); *B41J 2/01* (2013.01); *B41J 11/002* (2013.01);
(Continued)

(58) Field of Classification Search
USPC .......................................... 347/95, 98, 100
See application file for complete search history.

(56) References Cited

U.S. PATENT DOCUMENTS 9,016,847 B1 * 4/2015 Iijima ................... B41J 2/2114
347/100
2011/0261127 A1 10/2011 Kovacs et al.

FOREIGN PATENT DOCUMENTS

| JP | 2003112439 A | 4/2003 |
|---|---|---|
| JP | 2007-245653 A | 9/2007 |

(Continued)

OTHER PUBLICATIONS

International Search Report dated Apr. 21, 2015 for PCT/JP2015/056650.

(Continued)

*Primary Examiner* — Lam Nguyen
(74) *Attorney, Agent, or Firm* — Lucas & Mercanti, LLP

(57) ABSTRACT

The present invention relates to an image forming method which includes: curing an active ray curable ink containing a gelling agent; and additionally applying and curing another active ray curable ink and by which affinity of the additionally-applied ink is further improved. The method of the present invention is an image forming method including: a first step of applying a first ink, which contains a colorant, a gelling agent, a photopolymerizable compound, and a photoinitiator, to a recording medium; a second step of irradiating the first ink with an active ray to cure and fix the first ink; a third step of additionally applying a second ink which contains a photopolymerizable compound and a photoinitiator; and a fourth step of irradiating the second ink with an active ray, in this order, wherein the first ink contains 0.5 to 5.0% by mass of the gelling agent with respect to the entire mass of the ink, the second ink contains less than 5.0% by mass of the gelling agent with respect to the entire mass of the ink, and the fourth step is performed in a state where the cured and fixed first ink is heated.

18 Claims, 3 Drawing Sheets

(51) Int. Cl.
*C09D 11/107* (2014.01)
*C09D 11/38* (2014.01)
*C09D 11/322* (2014.01)

(52) U.S. Cl.
CPC ........ *B41M 5/0011* (2013.01); *B41M 5/0023* (2013.01); *B41M 7/009* (2013.01); *C09D 11/101* (2013.01); *C09D 11/107* (2013.01); *C09D 11/322* (2013.01); *C09D 11/38* (2013.01); *B41J 2202/03* (2013.01); *B41M 2205/12* (2013.01)

(56) References Cited

FOREIGN PATENT DOCUMENTS

| | | |
|---|---|---|
| JP | 2008213151 A | 9/2008 |
| JP | 2008223014 A | 9/2008 |
| JP | 2009132919 A | 6/2009 |
| JP | 2010000792 A | 1/2010 |
| JP | 2010228115 A | 10/2010 |
| JP | 2011-168022 A | 9/2011 |
| JP | 2011-168389 A | 9/2011 |
| WO | 2013094198 A1 | 6/2013 |
| WO | 2013157271 A1 | 10/2013 |
| WO | 2013161328 A1 | 10/2013 |

OTHER PUBLICATIONS

Notice of Reasons for Rejection dated Mar. 6, 2018 from corresponding Japanese Patent Application No. JP 2016-506570 and an English translation.

Notice of Reasons for Rejection dated Jun. 26, 2018 from corresponding Japanese Patent Application No. JP 2016-506570 and an English translation.

* cited by examiner

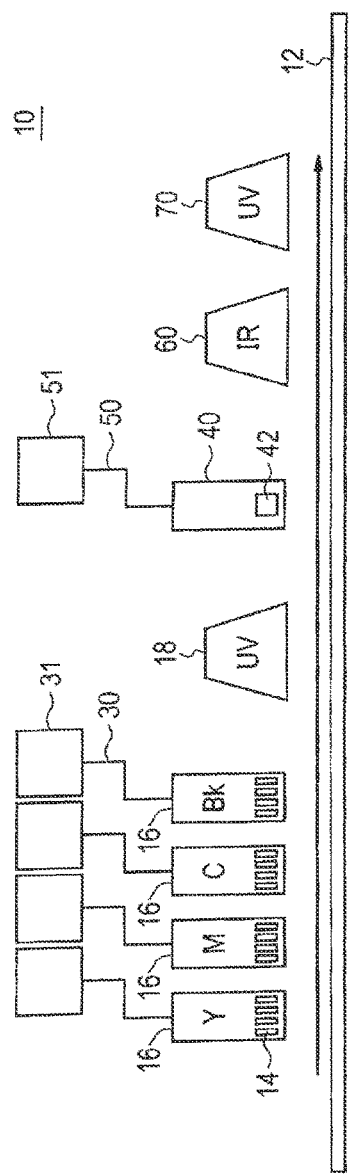
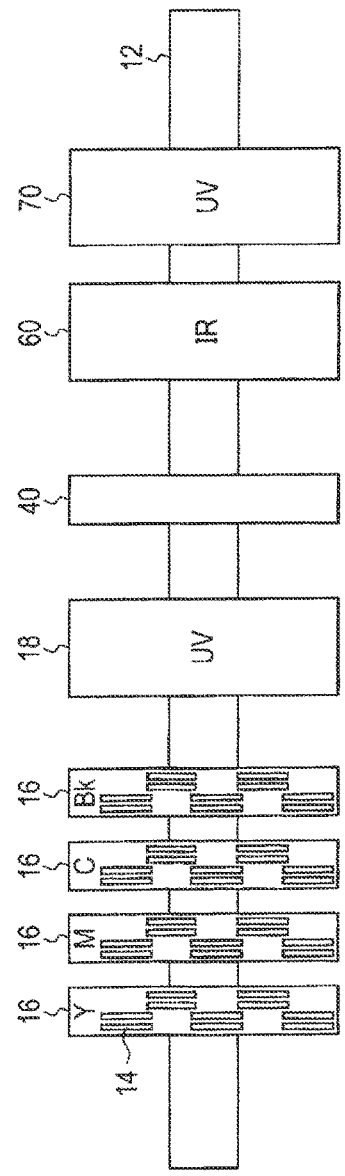
FIG. 1A
FIG. 1B

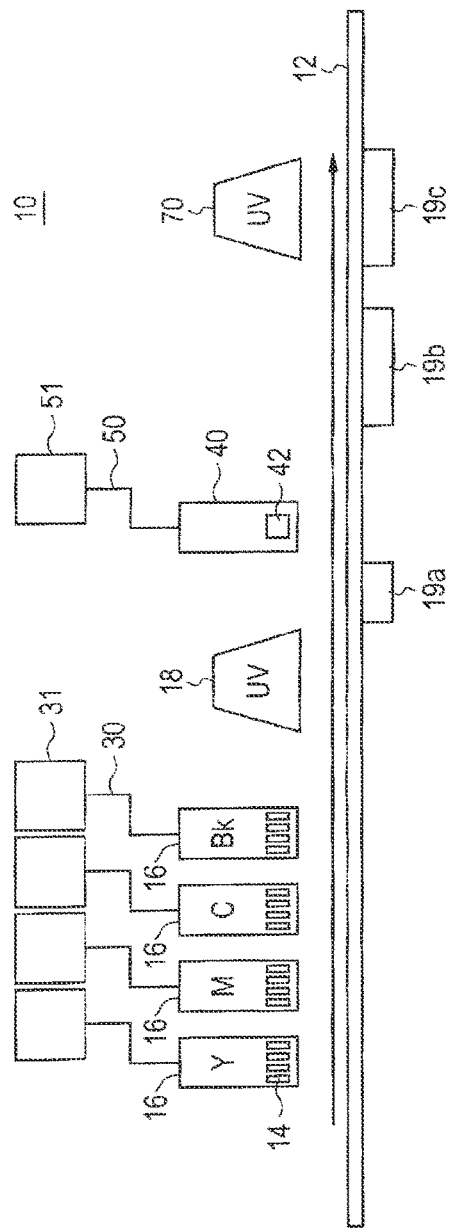
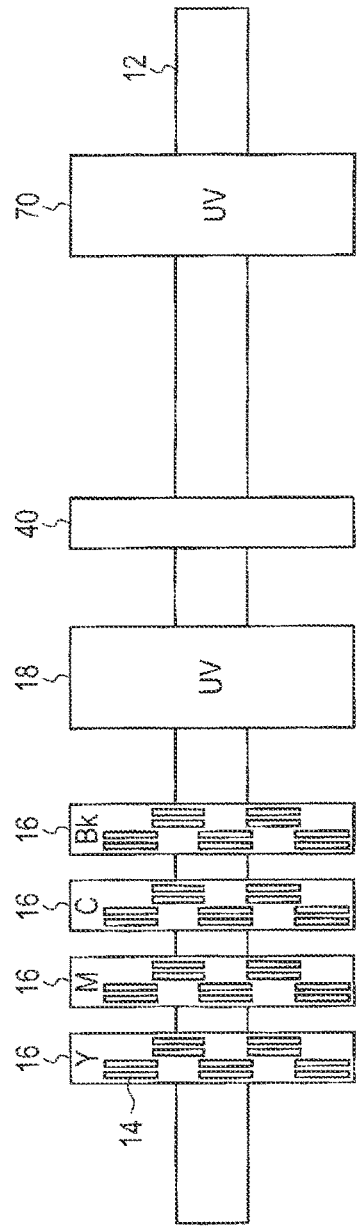
FIG. 2A
FIG. 2B

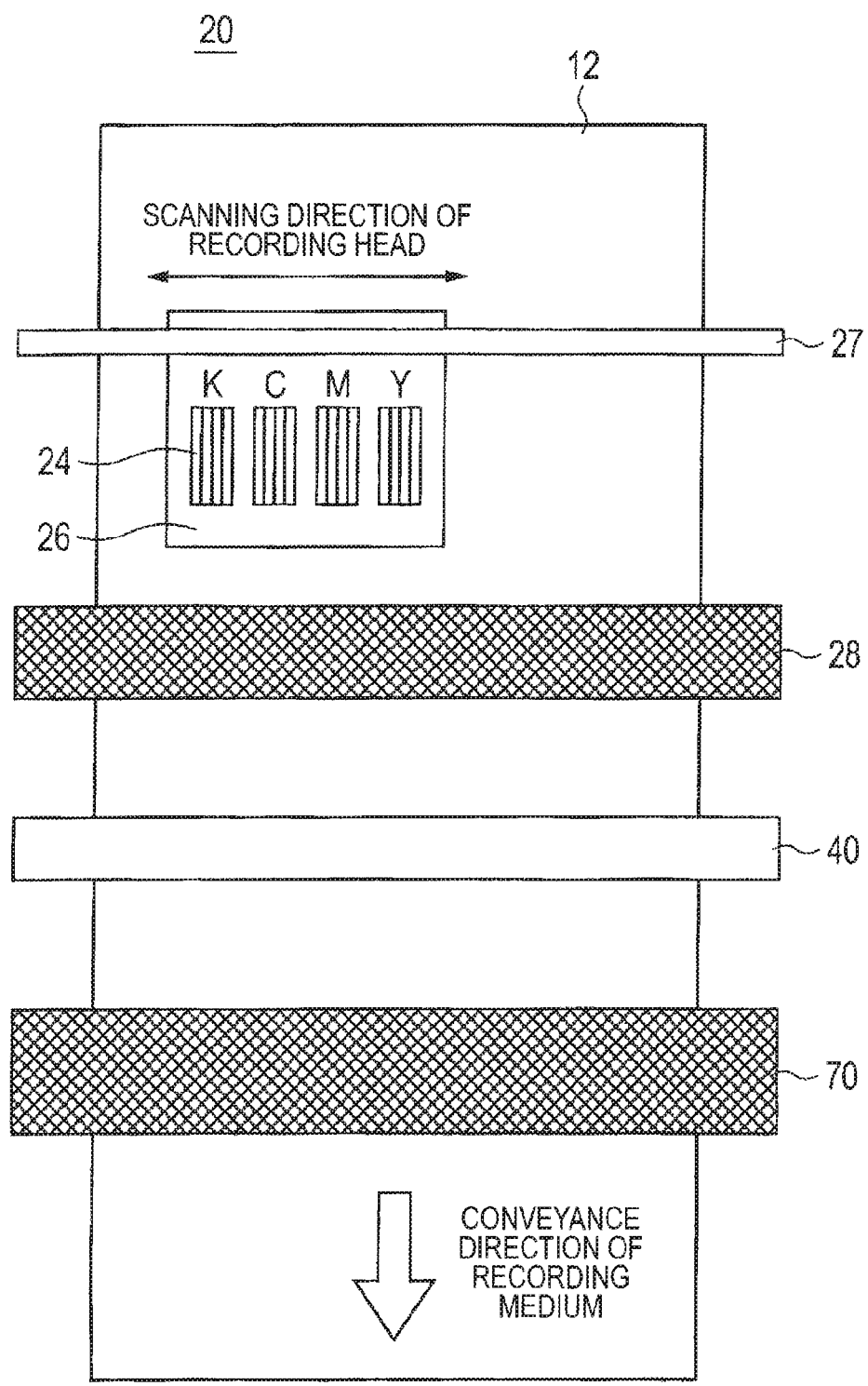

IMAGE FORMING METHOD

CROSS REFERENCE TO RELATED APPLICATION

This Application is a 371 of PCT/JP2015/056650 filed on Mar. 6, 2015 which, in turn, claimed the priority of Japanese Application No. 2014-045293 filed on Mar. 7, 2014, both applications are incorporated herein by reference.

TECHNICAL FIELD

The present invention relates to an image forming method.

BACKGROUND ART

Active ray curable inks are known as an ink by which an image having high scratch resistance and adhesiveness can be formed even on a recording medium that does not have ink absorbability. In an image forming method using an active ray curable ink, an image is formed by applying liquid droplets of the ink to a recording medium and then curing the ink by irradiation with active rays such as ultraviolet rays.

However, in an image forming method using a conventional active ray curable ink, there is a problem in that combining of adjacent dots cannot be suppressed particularly at the time of high-speed printing, and thus image quality is deteriorated. As a method for preventing combining of adjacent dots, a technique of adding a gelling agent to an active ray curable ink is proposed.

Efforts for further enhancing the quality of an image formed by an ink containing a gelling agent are also known. For example, in Patent Literature 1, an ink applied to a recording medium is caused to reflow by heating through irradiation with an infrared ray so as to reduce the viscosity of the ink, and thus the surface of the ink is smoothened. Further, in Patent Literature 2, when an ink of which gel rheology conforms well with a paper substrate is used, the gloss of printed region matches the gloss of non-printed region.

As another method for enhancing the image quality, a technique is known in which another active ray curable ink is additionally applied to an active ray curable ink, which has been cured by irradiation with an active ray, so as to perform coating, for the purpose of providing gloss to a printed image or providing resistance to impact from the outside. In Patent Literature 3, the gloss of an image is controlled by an overcoat composition containing a gelling agent, a curable monomer, a curable wax, and a photoinitiator.

CITATION LIST

Patent Literature

Patent Literature 1: US 2011/0261127 A
Patent Literature 2: JP 2009-132919 A
Patent Literature 3: JP 2010-792 A

SUMMARY OF INVENTION

Technical Problem

When an active ray curable ink containing a gelling agent is cured and another active ray curable ink is additionally applied onto the cured active ray curable ink and cured, if affinity between the previously-cured ink and the additionally-applied ink is poor, the additionally-applied ink is repelled so that problems easily arise in that non-coating portions (white spots) remain (a decrease in wettability), the ink is easily peeled off even when the ink is cured (a decrease in adhesiveness), or the additionally-applied ink is not cured from the beginning (a decrease in curability). For these reasons, it is desirable to improve affinity between the ink which has been first cured and the additionally-applied ink.

In this regard, an object of the present invention is to provide an image forming method in which, when an active ray curable ink containing a gelling agent is cured and then another active ray curable ink is additionally applied and cured, affinity between the previously-applied ink and the additionally-applied ink is further improved.

Solution to Problem

The present invention relates to an image forming method described below.

[1] An image forming method including: a first step of applying a first active ray curable ink, which contains a colorant, a gelling agent, a photopolymerizable compound, and a photoinitiator and undergoes temperature-induced reversible sol-gel phase transition, to a recording medium; a second step of irradiating the first ink with an active ray to cure and fix the first ink; a third step of additionally applying a second active ray curable ink which contains a photopolymerizable compound and a photoinitiator; and a fourth step of irradiating the second ink with an active ray, in this order, wherein the first active ray curable ink contains 0.5 to 5.0% by mass of the gelling agent with respect to the entire mass of the ink, the second active ray curable ink contains less than 5.0% by mass of the gelling agent with respect to the entire mass of the ink, and the fourth step is performed in a state where the cured and fixed first ink is heated.

[2] The method according to [1], wherein the gelling agent contained in the first ink or the second ink is at least one kind of compound among compounds represented by the following General Formulas (G1) and (G2):

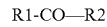  General Formula (G1):

  General Formula (G2):

wherein R1 to R4 each independently represent a hydrocarbon group having a straight-chain moiety with 12 or more carbon atoms.

[3] The method according to [1] or [2], wherein the photopolymerizable compound contains 10 to 40% by mass of a (meth)acrylate compound, which has a molecular weight of 280 to 1500 and a C log P value of 4.0 to 7.0, with respect to the entire mass of the first ink.

[4] The method according to any one of [1] to [3], wherein in the second step, the irradiation with the active ray is performed by using an LED light source having a maximum illuminance in a wavelength range of 385 to 410 nm, and the maximum illuminance of the surface of the applied first ink is 0.5 to 5.0 w/cm2.

[5] The method according to any one of [1] to [4], wherein the first step is performed by discharging the first active ray curable ink from a nozzle of an inkjet recording head onto the recording medium.

[6] The method according to [5], wherein the first step is performed in a single pass manner.

[7] The method according to any one of [1] to [6], wherein at least the second step is performed while the recording medium is moved at a linear speed of 50 to 120 m/min.
[8] The method according to any one of [1] to [7], wherein the second ink does not substantially contain a colorant.
[9] The method according to any one of [1] to [7], wherein the second ink contains a white pigment.
[10] The method according to any one of [1] to [9], further including a step of heating the cured and fixed first ink.
[11] The method according to [10], wherein the heating step is performed between the second step and the third step.
[12] The method according to [10], wherein the heating step is performed between the third step and the fourth step.
[13] The method according to any one of [1] to [12], wherein the step of heating the cured and fixed first ink is a step of irradiating the surface of the cured and fixed first ink with an infrared ray.

Advantageous Effects of Invention

According to the image forming method of the present invention, it is possible to provide an image forming method which is excellent in wettability, adhesiveness, and curability when an active ray curable ink containing a gelling agent is cured and another active ray curable ink is additionally applied onto the cured active ray curable ink and cured.

BRIEF DESCRIPTION OF DRAWINGS

FIG. 1A is a side view illustrating an example of the configuration of main parts of a line recording type inkjet recording apparatus according to an embodiment of the present invention, and FIG. 1B is a top view of FIG. 1A.

FIG. 2A is a side view illustrating another example of the configuration of main parts of a line recording type inkjet recording apparatus according to another embodiment of the present invention, and FIG. 2B is a top view of FIG. 2A.

FIG. 3 is a top view illustrating an example of the configuration of main parts of a serial recording type inkjet recording apparatus according to another embodiment of the present invention.

DESCRIPTION OF EMBODIMENTS

The present invention relates to an in an image forming method including: a first step of applying a first active ray curable ink (hereinafter, also referred to as the first ink), which contains a colorant, a gelling agent, a photopolymerizable compound, and a photoinitiator and undergoes temperature-induced reversible sol-gel phase transition, to a recording medium; a second step of irradiating the first ink with an active ray to cure and fix the first ink;
a third step of additionally applying a second active ray curable ink (hereinafter, also referred to as the second ink) which contains a photopolymerizable compound and a photoinitiator; and a fourth step of irradiating the second ink with an active ray, in this order, wherein the first active ray curable ink contains 0.5 to 5.0% by mass of the gelling agent with respect to the entire mass of the ink, the second active ray curable ink contains less than 5.0% by mass of the gelling agent with respect to the entire mass of the ink, and the fourth step is performed in a state where the cured and fixed first ink is heated.

As a means for enhancing affinity between the first ink and the second ink, it is considered that the surface of the first ink is smoothened so as to increase the contact area between the inks. However, as a result of researches of the present inventors, it was found that even in a case where the upper surface of the first ink is smoothened with infrared irradiation and cured with an active ray, and the second ink is applied onto the cured first ink and cured as in Patent Literature 1, problems still arise in wettability, adhesiveness, and curability. In this regard, the present invention is intended to enhance affinity between the first ink and the second ink by focusing on the gelling agent contained in the first ink.

When the fourth step is performed in a state where the cured and fixed first ink is heated, the molecular movement of the polymerizable compound contained in the cured (polymerized) first ink becomes intense by heating so that the degree of solubility of the gelling agent with respect to the polymerizable compound in a printed film is increased. Thus, the gelling agent slightly precipitated in the vicinity of the surface of the cured and fixed first ink is dissolved in the printed film of the first ink. For this reason, it is considered that affinity between the first ink and the second ink is improved.

The improvement in the affinity as described above is significantly observed when the amount of the gelling agent contained in the first ink is as small as 0.5 to 5.0%. The reason for this is not known yet; however, the reason is speculated that, since a large amount of the gelling agent is precipitated in the vicinity of the surface of the cured and fixed first ink when the amount of the gelling agent is large, the gelling agent remains in the vicinity of the surface even when the molecular movement of the polymerizable compound is increased by heating. On the other hand, when the amount of the gelling agent is in a range of 0.5 to 5.0%, the gelling agent can be sufficiently and uniformly dissolved in the printed film by heating the cured and fixed first ink, and thus affinity is improved.

1. Active Ray Curable Ink

The first active ray curable ink according to the present invention can be used for forming an image by applying the ink to a recording medium. The first active ray curable ink is an ink which contains a colorant, a gelling agent, a photopolymerizable compound, and a photoinitiator and undergoes temperature-induced reversible sol-gel phase transition.

The second active ray curable ink according to the present invention can be used for additionally applying the ink on the surface, to which the first ink is applied, of the recording medium after the first active ray curable ink is applied and cured. The second active ray curable ink contains at least a photopolymerizable compound and a photoinitiator. As the second active ray curable ink, an ink having the same composition as that of the first active ray curable ink may be used or an ink having the composition different from that of the first active ray curable ink may be used. The second active ray curable ink may not substantially contain a colorant. Herein, the expression "not substantially contain a colorant" means that the content of the colorant is 0.1% by mass or less with respect to the entire mass of the second ink. Further, the second active ray curable ink may contain a white pigment or the like as a colorant.

(Gelling Agent)

The gelling agent contained in the first ink has a function of causing the ink to undergo temperature-induced reversible sol-gel phase transition. The gelling agent may be dissolved in a photopolymerizable compound at a temperature higher than a gelation temperature or may be crystallized in the ink at a temperature lower than the gelation temperature. Also, the second ink may contain the gelling agent, and at this time, the first ink and the second ink may contain the same type of gelling agent or mutually different types of gelling agents. The second ink may not contain the gelling agent.

In the present invention, the types of gelling agent are not particularly limited. However, based on the findings of the present inventors, a gelling agent forming a card house structure easily causes a problem in affinity between the first ink and the second ink. The reason for this is considered that in the case of using such a gelling agent, when the ink is cured, the precipitated gelling agent is likely to be localized in the vicinity of the surface of the ink. For this reason, in the case of using the gelling agent forming a card house structure, the method of the present invention can be more advantageously applied.

The "card house structure" indicates a structure in which, when the gelling agent is crystallized in an ink, a space three-dimensionally surrounded by plate-like crystals, which are crystallization products of the gelling agent, is formed so that the photopolymerizable compound is included in the space. When the card house structure is formed, the liquid photopolymerizable compound can be maintained and ink droplets can be pinned. Accordingly, combining of liquid droplets at the time of printing can be prevented.

Regarding the gelling agent forming the "card house structure," it is preferable that the photopolymerizable compound dissolved in the ink and the gelling agent be compatible with each other. Further, when a gelling agent, which is immediately crystallized to form a strong card house structure after ink droplets are landed on a recording medium, is used, it is possible to stably suppress combining of droplets even at the time of high-speed printing.

Examples of such a gelling agent include:
aliphatic ketone compounds;
aliphatic ester compounds;
petroleum waxes such as paraffin wax, microcrystalline wax, and petrolatum;
plant-derived waxes such as candelilla wax, carnauba wax, rice wax, sumac wax, jojoba oil, solid jojoba wax, and jojoba ester;
animal-derived waxes such as beeswax, lanolin, and spermaceti;
mineral waxes such as montan wax and hydrogenated wax;
hydrogenated castor oil or hydrogenated castor oil derivatives;
modified waxes such as montan wax derivatives, paraffin wax derivatives, microcrystalline wax derivatives, and polyethylene wax derivatives;
higher fatty acids such as behenic acid, arachidic acid, stearic acid, palmitic acid, myristic acid, lauric acid, oleic acid, and erucic acid;
higher alcohols such as stearyl alcohol and behenyl alcohol;
hydroxystearic acids such as 12-hydroxystearic acid; 12-hydroxystearic acid derivatives;
fatty acid amides such as lauric acid amide, stearic acid amide, behenic acid amide, oleic acid amide, erucic acid amide, ricinoleic acid amide, and 12-hydroxystearic acid amide (for example, NIKKA AMIDE series manufactured by Nippon Kasei Chemical Co., Ltd., ITOWAX series manufactured by Ito Oil Chemicals Co., Ltd., and FATTY AMID series manufactured by Kao Corporation);
N-substituted fatty acid amides such as N-stearyl stearic acid amide and N-oleyl palmitic acid amide;
specialty fatty acid amides such as N,N'-ethylene bisstearylamide, N,N'-ethylene bis-12-hydroxystearylamide, and N,N'-xylylene bisstearylamide;
higher amines such as dodecylamine, tetradecylamine, and octadecylamine;
fatty acid ester compounds such as stearyl stearic acid, oleyl palmitic acid, glycerin fatty acid ester, sorbitan fatty acid ester, propylene glycol fatty acid ester, ethylene glycol fatty acid ester, and polyoxyethylene fatty acid ester (for example, EMALLEX series manufactured by Nihon Emulsion Co., Ltd., RIKEMAL series manufactured by Riken Vitamin Co., Ltd., and POEM series manufactured by Riken Vitamin Co., Ltd.);
esters of sucrose fatty acids such as stearamide ethyl stearate (SLIAID S manufactured by Nippon Kasei Chemical Co., Ltd.) sucrose stearic acid and sucrose palmitic acid (for example, RYOTO Sugar Ester series manufactured by Mitsubishi-Kagaku Foods Corporation);
synthetic waxes such as polyethylene wax and $\alpha$-olefin-malic anhydride copolymer wax (UNILIN series manufactured by Baker-Petrolite, or the like);
dimeric acids;
dimer diols (PRIPOR series manufactured by Croda International Plc, or the like) fatty acid inulins such as inulin stearate;
fatty acid dextrins such as dextrin palmitate and dextrin myristate (RHEOPEARL series manufactured by Chiba Flour Milling Co., Ltd.);
glyceryl behenate/eicosanedioate;
polyglyceryl eicosane behenate (NOMCORT series manufactured by Nisshin Oillio Group, Ltd.);
amide compounds such as N-lauroyl-L-glutamic acid dibutylamide and N-(2-ethylhexanoyl)-L-glutamic acid dibutylamide (available from Ajinomoto Fine-Techno Co., Inc.);
dibenzylidene sorbitols such as 1,3:2,4-bis-O-benzylidene-D-glucitol (available from New Japan Chemical Co., Ltd. as GELOL D); and
low molecular weight oil gelling agents described in JP 2005-126507 A, JP 2005-255821 A, and JP 2010-111790 A.

Particularly, a gelling agent containing a straight-chain alkyl group having 12 or more carbon atoms can easily form the above-mentioned "card house structure."

Specific examples of the gelling agent containing a straight-chain alkyl group having 12 or more carbon atoms include aliphatic ketone compounds, aliphatic ester compounds, higher fatty acids, higher alcohols, and fatty acid amides, which contain a straight-chain alkyl group having 12 or more carbon atoms.

Herein, when a gelling agent not having a polar group such as —OH or —COOH at the terminals of the alkyl chain is used, it is possible to improve stability in the ink in a sol state and to suppress precipitation or phase separation of the gelling agent. Moreover, it is also possible to suppress bleed-out of the gelling agent from the cured film of the ink over time. As such a gelling agent, an aliphatic ketone compound or aliphatic ester compound represented by the following General Formulas (G1) and (G2) is mentioned.

R1-CO—R2                General Formula (G1):

R3-COO—R4               General Formula (G2):

In General Formulas (G1) and (G2), R1 to R4 each independently represent an alkyl group having a straight-chain moiety with 12 or more carbon atoms. R1 to R4 may also have a branched moiety.

In General Formula (G1), the alkyl groups represented by R1 and R2 each independently include, preferably, a straight-chain alkyl group with 12 or more but 25 or less carbon atoms. When the number of carbon atoms in the straight-chain moiety contained in each of the groups represented by R1 and R2 is set to 12 or more, crystallinity necessary as a gelling agent can be secured, and in the aforementioned card house structure, sufficient space for enclosing therein the photopolymerizable compound can be formed. On the other hand, when the number of carbon atoms in the straight-chain moiety contained in each of the groups represented by R1 and R2 is set to 25 or less, a melting point is suppressed to an appropriate range, and in a case where the ink according to the present invention is discharged from an inkjet recording head, the gelling agent can be dissolved in the ink even at a typical discharge temperature.

Examples of the aliphatic ketone compound represented by the above General Formula (G1) include dilignoceryl ketone (C24-C24), dibehenyl ketone (C22-C22, melting point: 88° C.), distearyl ketone (C18-C18, melting point: 84° C.), dieicosyl ketone (C20-C20), dipalmityl ketone (C16-C16, melting point: 80° C.), dimyristyl ketone (C14-C14), dilauryl ketone (C12-C12, melting point: 68° C.), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), and stearyl behenyl ketone (C18-C22).

Examples of commercially available products of the compound represented by General Formula (G1) include 18-Pentatriacontanon (manufactured by Alfa Aesar), Hentriacontan-16-on (manufactured by Alfa Aesar), and KAO Wax T1 (manufactured by Kao Corporation).

The aliphatic ketone compound may be contained in the active ray curable ink either singly or as a mixture of two or more types.

In General Formula (G2), the alkyl groups represented by R3 and R4 are not particularly limited and are each independently, preferably, an alkyl group containing a straight-chain moiety with 12 or more but 26 or less of carbon atoms. When the number of carbon atoms of the straight-chain moiety in each of the alkyl groups represented by R3 and R4 is 12 or more but 26 or less, similarly to the compound represented by General Formula (G1), the resulting compound can form the aforementioned card house structure and does not have an excessively high melting point while having crystallinity necessary for the gelling agent.

Examples of the aliphatic ester compound represented by General Formula (G2) include behenyl behenate (C21-C22, melting point: 70° C.), icosyl icosanoate (C19-C20), stearyl stearate (C17-C18, melting point: 60° C.), palmityl stearate (C17-C16), lauryl stearate (C17-C12), cetyl palmitate (C15-C16, melting point: 54° C.), stearyl palmitate (C15-C18), myristyl myristate (C13-C14, melting point: 43° C.), cetyl myristate (C13-C16, melting point: 50° C.), octyldodecyl myristate (C13-C20), stearyl oleate (C17-C18), stearyl erucate (C21-C18), stearyl linoleate (C17-C18), behenyl oleate (C18-C22), myricyl cerotate (C25-C16), and arachidyl linoleate (C17-C20).

Examples of commercially available products of the aliphatic ester compound represented by General Formula (G2) include UNISTAR M-2222SL (manufactured by NOF CORPORATION), UNISTAR M-9676 (manufactured by NOF CORPORATION), EXCEPARL SS (manufactured by Kao Corporation, melting point: 60° C.), NISSAN ELECTOL (registered trademark) WEP-2 (manufactured by NOF CORPORATION), NISSAN ELECTOL (registered trademark) WEP-4 (manufactured by NOF CORPORATION), WEP-11 (manufactured by NOF CORPORATION), EMALEX CC-18 (manufactured by Nihon Emulsion Co., Ltd.), AMREPS PC (manufactured by KOKYU ALCOHOL KOGYO CO., LTD.), EXCEPARL MYM (manufactured by Kao Corporation), SPERMACETI (manufactured by NOF CORPORATION), and EMALEX CC-10 (manufactured by Nihon Emulsion Co., Ltd.). Most of these commercially available products are mixtures of two or more types and thus may be separated and purified, as necessary.

The aliphatic ester compound may be contained in the active ray curable ink either singly or as a mixture of two or more types.

According to the method of the present invention, even in the case of using these gelling agent, affinity between the first ink and the second ink can be enhanced. Incidentally, these gelling agents may be contained in both of the first ink and the second ink or may be contained in any one of them.

The amount of the gelling agent contained in the first active ray curable ink is preferably 0.5 to 5.0% by mass and further preferably 0.5 to 3.0% by mass with respect to the total amount of the ink. When the amount of the gelling agent is set to 0.5% by mass or more, ink droplets can undergo gelation (temperature-induced sol-gel phase transition). On the other hand, when the amount of the gelling agent is set to 5% by mass or less, affinity with the second ink can be enhanced.

From the viewpoint of providing adhesiveness and curability to the first ink, the amount of the gelling agent contained in the second active ray curable ink is preferably less than 5.0% by mass with respect to the total amount of the ink, and more preferably, the second ink does not substantially contain the gelling agent. Herein, the expression "does not substantially contain the gelling agent" means that the content of the gelling agent is 0.1% by mass or less with respect to the entire second ink.

(Photopolymerizable Compound)

The photopolymerizable compound contained in the first ink and the second ink is a compound which undergoes crosslinking or polymerization by irradiation with an active ray. Examples of the active ray include electron beams, ultraviolet rays, α rays, γ rays, and X rays, and ultraviolet rays are preferable. The photopolymerizable compound may be a radical polymerizable compound or a cationic polymerizable compound. A radical polymerizable compound is preferable. The first ink and the second ink may contain the same type of photopolymerizable compound or mutually different types of photopolymerizable compounds.

The radical polymerizable compound may be a compound (a monomer, an oligomer, a polymer, or a mixture of these) having an ethylenically unsaturated bond, which is radically polymerizable. In the active ray curable ink, either single or two or more types of the radical polymerizable compounds may be contained.

Examples of the compound having an ethylenically unsaturated bond, which is radically polymerizable, include an unsaturated carboxylic acid and a salt thereof, an unsaturated carboxylic ester compound, an unsaturated carboxylic urethane compound, an unsaturated carboxylic amide compound and an anhydride thereof, acrylonitrile, styrene, unsaturated polyester, unsaturated polyether, unsaturated polyamide, and unsaturated urethane. Examples of the unsaturated carboxylic acid include (meth)acrylic acid, itaconic acid, crotonic acid, isocrotonic acid, and maleic acid.

Among them, the radical polymerizable compound is preferably an unsaturated carboxylic ester compound and more preferably a (meth)acrylate compound. The (meth) acrylate compound may be not only a monomer but also be an oligomer, a mixture of a monomer and an oligomer, a modified product, or an oligomer having a polymerizable functional group. Herein, the term "(meth)acrylate" indicates both or one of "acrylate" and "methacrylate" and the term "(meth)acryl" indicates both or one of "acryl" and "methacryl."

The first ink or the second ink may contain a (meth) acrylate compound having a C log P value in a range of 4.0 to 7.0 (hereinafter, also referred to as "(meth)acrylate compound A") as a photopolymerizable compound. When the C log P value of this (meth)acrylate compound A is more than 4.0, the gelling agent is easily dissolved at the time of heating, and thus the ink can easily undergo the sol-gel phase transition. In addition, when the ink according to the present invention is discharged from the inkjet recording head, a failure of discharging the ink can be reduced. On the other hand, when the C log P value of the (meth)acrylate compound A is set to less than 7.0, it is possible to enhance the solubility of the photoinitiator in the ink and to enhance the curability of the ink and discharging properties of the ink from the inkjet recording head. The C log P value of the (meth)acrylate compound A is more preferably in a range of 4.5 to 6.0. In particular, it is preferable that at least the first ink contain the (meth)acrylate compound A.

Herein, the term "Log P value" is a coefficient indicating affinity of an organic compound to water and 1-octanol. Regarding the 1-octanol/water partition coefficient P, in a partition equilibrium achieved when a trace amount of a compound is dissolved as a solute in a two-liquid phase solvent of 1-octanol and water, the partition coefficient P is the ratio of equilibrium concentrations of the compound in the respective solvents, and the partition coefficient is expressed as a logarithm Log P of the bottom 10. That is, the "log P value" is a logarithmic value of the partition coefficient of 1-octanol/water, and is known as an important parameter indicating the hydrophilicity and hydrophobicity of a molecule.

The "C Log P value" is a Log P value obtained by calculation. The C Log P value may be calculated by a fragment method, an atomic approach method or the like. More specifically, in order to calculate the C log P value, the fragment method described in literatures (C. Hansch and A. Leo, "Substituent Constants for Correlation Analysis in Chemistry and Biology" (John Wiley & Sons, New York, 1969)), or commercially available software package 1 or 2 described below may be used.

Software package 1: MedChem Software (Release 3.54, August 1991, Medicinal Chemistry Project, Pomona College, Claremont, Calif.)

Software package 2: ChemDraw Ultra ver. 8.0. (April 2003, CambridgeSoft Corporation, USA)

The numerical value of the C log P value described in the present specification or the like is a "C log P value" calculated using the software package 2.

The molecular weight of the (meth) acrylate compound A is preferably in a range of 280 to 1500 and more preferably in a range of 280 to 800. In order to stably discharge the ink droplets from the inkjet recording head in a case where the ink according to the present invention is discharged from the inkjet recording head, the viscosity of the ink at a discharge temperature is preferably set to a value from 7 to 14 mPa·s. An ink composition, which contains the (meth) acrylate compound A having a molecular weight of 280 or more and the gelling agent, undergoes a small change in the viscosity of the ink below and above the discharge temperature. Therefore, it is easy to adjust the viscosity of the ink to the above range. In addition, the (meth) acrylate compound A having a molecular weight of 280 or more has little odor, and thus the odor of the active ray curable ink or the odor of a cured product thereof can be reduced. On the other hand, when the molecular weight of the (meth) acrylate compound A is set to 1500 or less, the sol viscosity of the ink can be maintained to be in a preferable range.

The amount of the (meth) acrylate compound A contained in the first active ray curable ink is preferably in a range of 10 to 40% by mass. When the amount of the (meth) acrylate compound A having a C log P value in a range of 4.0 to 7.0 is set to 10% by mass or more, solubility of the gelling agent with respect to the ink is increased. Therefore, the gelling agent precipitated in the vicinity of the surface of the first ink, which is cured and fixed by heating, is easily dissolved in the cured polymerizable compound, and thus affinity between the surface of the cured and fixed first ink and the second ink can be enhanced. On the other hand, when the amount of the (meth) acrylate compound A is set to 40% by mass or less, hydrophilicity of the surface of the first ink after curing can be properly maintained and wettability and adhesiveness of the second ink can be enhanced. The amount of the (meth) acrylate compound A contained in the first active ray curable ink is further preferably in a range of 15 to 25% by mass.

More preferred examples of the (meth) acrylate compound A having a C log P value in a range of 4.0 to 7.0 include (1) a trifunctional or higher methacrylate or acrylate compound, which has 3 to 14 structures represented by (—C(CH3) H—CH2-O—) in the molecule, and (2) a bifunctional or higher methacrylate or acrylate compound, which has a cyclic structure in the molecule. These (meth) acrylate compounds A have high photocurability and less contracted when they are cured. Furthermore, these compounds have high repeated reproducibility of sol-gel phase transition.

(1) The trifunctional or higher methacrylate or acrylate compound, which has 3 to 14 structures represented by (—C(CH3)H—CH2-O—) in the molecule is a compound obtained by modifying a hydroxyl group of a compound having three or more hydroxyl groups with propylene oxide and esterifying the obtained modified product with (meth) acrylic acid. Specific examples of such a compound include:

3PO modified trimethylolpropane triacrylate Photomer 4072 (molecular weight: 471, C log P: 4.90, manufactured by Cognis), and 3PO modified trimethylolpropane triacrylate Miramer M360 (molecular weight: 471, C log P: 4.90, manufactured by Miwon Specialty Chemical Co., Ltd.)

(2) The bifunctional or higher methacrylate or acrylate compound, which has a cyclic structure in the molecule, is a compound obtained by esterifying a hydroxyl group of a compound having two or more hydroxyl groups and tricycloalkane with (meth)acrylic acid, for example. Specific examples of such a compound include:

tricyclodecane dimethanol diacrylate NK ESTER A-DCP (molecular weight: 304, C log P: 4.69); and tricyclodecane dimethanol dimethacrylate NK ESTER DCP (molecular weight: 332, C log P: 5.12).

Other specific examples of the (meth)acrylate compound A also include 1, 10-decanediol dimethacrylate NK ESTER DOD-N (molecular weight: 310, C log P: 5.75, manufactured by Shin Nakamura Chemical Co., Ltd.) and 8EO modified nonylphenol acrylate Miramer M166 (molecular weight: 626, C log P: 6.42, manufactured by Miwon Specialty Chemical Co., Ltd.).

Examples of other photopolymerizable compounds include 4EO modified hexanediol diacrylate (CD561, manufactured by Sartomer Company, Inc., molecular weight: 358), 3EO modified trimethylolpropane triacrylate (SR454, manufactured by Sartomer Company, Inc., molecular weight: 429), 4EO modified pentaerythritol tetraacrylate (SR494, manufactured by Sartomer Company, Inc., molecular weight: 528), 6EO modified trimethylolpropane triacrylate (SR499, manufactured by Sartomer Company, Inc., molecular weight: 560), polyethylene glycol diacrylate (NK ESTER A-400, manufactured by Shin Nakamura Chemical Co., Ltd., molecular weight: 508), (NK ESTER A-600, manufactured by Shin Nakamura Chemical Co., Ltd., molecular weight: 708), polyethylene glycol dimethacrylate (NK ESTER 9G, manufactured by Shin Nakamura Chemical Co., Ltd., molecular weight: 536), tetraethylene glycol diacrylate (V#335HP, manufactured by Osaka Organic Chemical Industry Ltd., molecular weight: 302), octadecyl acrylate (STA manufactured by Osaka Organic Chemical Industry Ltd., molecular weight: 325, melting point: 30° C.), dipropylene glycol diacrylate (NK ESTER APG-100, manufactured by Shin Nakamura Chemical Co., Ltd., molecular weight: 242), diethylene glycol diacrylate (SR230, manufactured by Sartomer Company, Inc., molecular weight: 214), isocyanurate triacrylate (NK ESTER A-9300, manufactured by Shin Nakamura Chemical Co., Ltd., molecular weight: 423, melting point: 53° C.), tetramethylolmethane triacrylate (NK ESTER A-TMM-3L, manufactured by Shin Nakamura Chemical Co., Ltd., molecular weight: 298), dipentaerythritolpolyacrylate (NK ESTER A-9550, manufactured by Shin Nakamura Chemical Co., Ltd.), ditrimethylolpropane tetraacrylate (SR355, manufactured by Sartomer Company, Inc., molecular weight: 466), glycerin propoxy acrylate (OTA480, manufactured by DAICEL-CYTEC Company, Ltd.), polyester acrylate (GENOMER 3414, manufactured by RAHN AG), and an epoxy acrylate oligomer (ETERCURE 6234, manufactured by Eternal Chemical Co., Ltd.).

(Photoinitiator)

A photoinitiator (photopolymerization initiator) contained in the first ink and the second ink can be used as a radical polymerization initiator when the photopolymerizable compound contains a radical polymerizable compound, and the photoinitiator can be used as a photoacid generating agent when the photopolymerizable compound contains a cationic polymerizable compound.

The radical polymerization initiator includes an intramolecular bond cleaving type and an intramolecular hydrogen withdrawing type. The first ink and the second ink may contain the same type of photopolymerizable compound or may contain mutually different types of photopolymerizable compounds according to the types of photopolymerizable compound contained in each of the inks.

Examples of the intramolecular bond cleaving type photoinitiator include acetophenones such as diethoxy acetophenone, 2-hydroxy-2-methyl-1-phenylpropane-1-one, benzyl dimethyl ketal, 1-(4-isopropylphenyl)-2-hydroxy-2-methylpropane-1-one, 4-(2-hydroxyethoxy)phenyl-(2-hydroxy-2-propyl) ketone, 1-hydroxycyclohexyl-phenyl ketone, 2-methyl-2-morpholino(4-thio methylphenyl)propane-1-one, and 2-benzyl-2-dimethylamino-1-(4-morpholinophenyl)-butanone; benzoins such as benzoin, benzoin methyl ether, and benzoin isopropyl ether; acyl phosphine oxides such as 2,4,6-trimethyl benzoin diphenyl phosphine oxide; benzyl, and methylphenyl glyoxy ester.

Examples of the intramolecular hydrogen withdrawing type photoinitiator include benzophenones such as benzophenone, o-benzoyl benzoic acid methyl-4-phenylbenzophenone, 4,4'-dichloro benzophenone, hydroxybenzophenone, 4-benzoyl-4'-methyl-diphenyl sulfide, acrylated benzophenone, 3,3',4,4'-tetra(t-butyl peroxy carbonyl) benzophenone, and 3,3'-dimethyl-4-methoxybenzophenone; thioxanthones such as 2-isopropyl thioxanthone, 2,4-dimethyl thioxanthone, 2,4-diethyl thioxanthone, and 2,4-dichloro thioxanthone; aminobenzophenones such as Michler's ketone and 4,4'-diethylaminobenzophenone; 10-butyl-2-chloro acridone, 2-ethyl anthraquinone, 9,10-phenanthrene quinone, and camphor quinone.

The content of the photoinitiator in the active ray curable ink is preferably 0.01% by mass to 10% by mass although the content varies depending on the types of active ray or photopolymerizable compound.

A photoacid generating agent may be contained in the photoinitiator in the active ray curable ink. As an example of the photoacid generating agent, a compound used for chemical amplification type photoresists or photo-cationic polymerization is used (see Pages 187 to 192 of "Imaging Yo Yuki Zairyo (Organic Materials Used for Imaging Applications)" edited by The Japanese Research Association for Organic Electronics Materials published by Bunshin Publishing (1993)).

A photopolymerization initiator auxiliary agent, a polymerization inhibitor, or the like may be further contained in the first ink and the second ink, as necessary. The photopolymerization initiator auxiliary agent may be a tertiary amine compound and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxy ethylaniline, triethylamine, and N,N-dimethyl hexylamine. Among them, N,N-dimethylamino-p-benzoic acid ethyl ester and N,N-dimethylamino-p-benzoic acid isoamyl ethyl ester are preferable. Only one or two or more types of these compounds may be contained in the active ray curable ink.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenyl hydroxylamine, tri-p-nitrophenylmethyl, N-(3-oxyanilino-1,3-dimethylbutylidene) aniline oxide, dibutyl cresol, cyclohexanone oxime cresol, guaiacol, o-isopropylphenol, butyraldoxime, methyl ethyl ketoxime, and cyclohexanone oxime.

(Colorant)

A colorant contained in the first ink may be a dye or a pigment. A pigment is more preferably from the viewpoint of having favorable dispersibility in a constituent of the ink and excellent weather resistance. Also, the second ink may contain a colorant, and at this time, the first ink and the second ink may contain the same type of colorant or mutually different types of colorants.

The dye may be an oil-soluble dye or the like. Examples of the oil-soluble dye include the following various dyes. Examples of a magenta dye include MS Magenta VP, MS Magenta HM-1450, and MS Magenta HSo-147 (all manufactured by Mitsui-Toatsu Chemicals), AIZEN SOT Red-1, AIZEN SOT Red-2, AIZEN SOT Red-3, AIZEN SOT Pink-1, and SPIRON Red GEH SPECIAL (all manufactured by Hodogaya Chemical Co., Ltd.), RESOLIN Red FB 200%, MACROLEX Red Violet R, and MACROLEX ROT5B (all manufactured by Bayer Japan), KAYASET Red B, KAYASET Red 130, and KAYASET Red 802 (all manufactured by Nippon Kayaku Co., Ltd.), PHLOXIN, ROSE BENGAL, and ACID Red (all manufactured by Daiwa Kasei Co., Ltd.), HSR-31 and DIARESIN Red K (all manufactured by Mitsubishi Chemical Corporation), and Oil Red (manufactured by BASF Japan).

Examples of a cyan dye include MS Cyan HM-1238, MS Cyan HSo-16, Cyan HSo-144, and MS Cyan VPG (all manufactured by Mitsui-Toatsu Chemicals), AIZEN SOT Blue-4 (manufactured by Hodogaya Chemical Co., Ltd.), RESOLIN BR. Blue BGLN 200%, MACROLEX Blue RR, CERES Blue GN, SIRIUS SUPRATURQ. Blue Z-BGL, and SIRIUS SUPRA TURQ. Blue FB-LL 330% (all manufactured by Bayer Japan), KAYASET Blue FR, KAYASET Blue N, KAYASET Blue 814, Turq. Blue GL-5 200, and Light Blue BGL-5 200 (all manufactured by Nippon Kayaku Co., Ltd.), DAIWA Blue 7000 and Oleosol Fast Blue GL (all manufactured by Daiwa Kasei Co., Ltd.), DIARESIN Blue P (manufactured by Mitsubishi Chemical Corporation), and SUDAN Blue 670, NEOPEN Blue 808, and ZAPON Blue 806 (all manufactured by BASF Japan).

Examples of a yellow dye include MS Yellow HSm-41, Yellow KX-7, and Yellow EX-27 (manufactured by Mitsui-Toatsu Chemicals), AIZEN SOT Yellow-1, AIZEN SOT Yellow-3, and AIZEN SOT Yellow-6 (all manufactured by Hodogaya Chemical Co., Ltd.), MACROLEX Yellow 6G and MACROLEX FLUOR. Yellow 10GN (all manufactured by Bayer Japan), KAYASET Yellow SF-G, KAYASET Yellow 2G, KAYASET Yellow A-G, and KAYASET Yellow E-G (all manufactured by Nippon Kayaku Co., Ltd.), DAIWA Yellow 330HB (manufactured by Daiwa Kasei Co., Ltd.), HSY-68 (manufactured by Mitsubishi Chemical Corporation), and SUDAN Yellow 146 and NEOPEN Yellow 075 (all manufactured by BASF Japan).

Examples of a black dye include MS Black VPC (manufactured by Mitsui-Toatsu Chemicals), AIZEN SOT Black-1 and AIZEN SOT Black-5 (all manufactured by Hodogaya Chemical Co., Ltd.), RESORIN Black GSN 200% and RESOLIN Black BS (all manufactured by Bayer Japan), KAYASET Black A-N (manufactured by Nippon Kayaku Co., Ltd.), DAIWA Black MSC (manufactured by Daiwa Kasei Co., Ltd.), HSB-202 (manufactured by Mitsubishi Chemical Corporation), and NEPTUNE Black X60 and NEOPEN Black X58 (all manufactured by BASF Japan).

The pigment is not particularly limited, but may be, for example, an organic pigment or an inorganic pigment with a color index number in the following.

Examples of a red or magenta pigment include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36. Examples of a blue or cyan pigment include Pigment Blue 1, 15, 15:1, 15:2, 15:3, 15:4, 15:6, 16, 17-1, 22, 27, 28, 29, 36, and 60. Examples of a green pigment include Pigment Green 7, 26, 36, and 50. Examples of a yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193. Examples of a black pigment include Pigment Black 7, 28, and 26.

Examples of a commercially available pigment include: Chromo Fine Yellow 2080, 5900, 5930, AF-1300, or 2700L, Chromo Fine Orange 3700L or 6730, Chromo Fine Scarlet 6750, Chromo Fine Magenta 6880, 6886, 6891N, 6790, or 6887, Chromo Fine Violet RE, Chromo Fine Red 6820 or 6830, Chromo Fine Blue HS-3, 5187, 5108, 5197, 5085N, SR-5020, 5026, 5050, 4920, 4927, 4937, 4824, 4933GN-EP, 4940, 4973, 5205, 5208, 5214, 5221, or 5000P, Chromo Fine Green 2GN, 2G0, 2G-550D, 5310, 5370, or 6830, Chromo Fine Black A-1103, Seikafast Yellow 10GH, A-3, 2035, 2054, 2200, 2270, 2300, 2400(B), 2500, 2600, ZAY-260, 2700(B), or 2770, Seikafast Red 8040, C405 (F), CA120, LR-116, 1531B, 8060R, 1547, ZAW-262, 1537B, GY, 4R-4016, 3820, 3891, or ZA-215, Seikafast Carmine 6B1476T-7, 1483LT, 3840, or 3870, Seikafast Bordeaux 10B-430, Seikalight Rose R40, Seikalight Violet B800 or 7805, Seikafast Maroon 460N, Seikafast Orange 900 or 2900, Seikalight Blue C718 or A612, and Cyanine Blue 4933M, 4933GN-EP, 4940, or 4973 (manufactured by Dainichiseika Color & Chemicals Mfg. Co., Ltd.);

KET Yellow 401, 402, 403, 404, 405, 406, 416, or 424, KET Orange 501, KET Red 301, 302, 303, 304, 305, 306, 307, 308, 309, 310, 336, 337, 338, or 346, KET Blue 101, 102, 103, 104, 105, 106, 111, 118, or 124, and KET Green 201 (manufactured by DIC Corporation);

Colortex Yellow 301, 314, 315, 316, P-624, 314, U10GN, U3GN, UNN, UA-414, or U263, Finecol Yellow T-13 or T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, or USN, Colortex Maroon 601, Colortex Brown B610N, Colortex Violet 600, Pigment Red 122, Colortex Blue 516, 517, 518, 519, A818, P-908, or 510, Colortex Green 402 or 403, and Colortex Black 702 or U905 (manufactured by SANYO COLOR WORKS, Ltd.);

Lionol Yellow 1405G, Lionol Blue FG 7330, FG7350, FG7400G, FG7405G, ES, or ESP-S (manufactured by TOYO INK CO., LTD.), Toner Magenta E02, Permanent Rubin F6B, Toner Yellow HG, Permanent Yellow GG-02, and Hostapeam Blue B2G (manufactured by Hoechst Industry Ltd.);

Novoperm P-HG, Hostaperm Pink E, or Hostaperm Blue B2G (manufactured by Clariant); and Carbon Black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, or CF9 (manufactured by Mitsubishi Chemical Corporation).

In addition, as a white pigment, titanium oxide (particularly, rutile type titanium dioxide) can also be used.

The volume average particle diameter of the pigment is preferably 0.08 to 0.5 μm. The maximum particle diameter of the pigment is preferably 0.3 to 10 μm and more preferably 0.3 to 3 μm. By adjusting the particle diameter of the pigment, it is possible to suppress clogging of a nozzle of the inkjet recording head and to maintain the storage stability of the ink, ink transparency, and curing sensitivity.

The amount of the colorant contained in the first active ray curable ink is preferably 0.1 to 20% by mass and more preferably 0.4 to 10% by mass with respect to the total mass of the first ink. The reason for this is that when the content of the pigment or dye is excessively low, color exhibition of an image to be obtained is not sufficient; on the other hand, when the content is excessively high, the viscosity of the ink is increased to lower discharging properties.

The amount of the colorant contained in the second active ray curable ink can be appropriately selected depending on the use of the second ink. When the second ink is used for transparent coating, it is preferable that the second ink substantially contain no colorant. The color of the colorant of the first ink can be emphasized by using the second ink for white coating or black coating. When the second ink contains a white colorant, the amount of the white colorant is preferably 0.1 to 40% by mass and more preferably 0.4 to 20% by mass with respect to the total mass of the second ink. When the second ink contains a black colorant, the amount of the black colorant is preferably 0.5 to 3.0% by mass and more preferably 0.7 to 2.5% by mass with respect to the total mass of the second ink.

The dispersion of the pigment can be performed, for example, using a ball mill, a sand mill, an attritor, a roll mill, an agitator, a Henschel mixer, a colloid mill, an ultrasound homogenizer, a pearl mill, a wet jet mill, a paint shaker, and the like. The dispersion of the pigment is preferably performed such that the pigment particles have a volume average particle diameter of preferably 0.08 to 0.5 μm and a maximum particle diameter of preferably 0.3 to 10 μm, and more preferably 0.3 to 3 μm. The dispersion of the pigment is adjusted by selections of a pigment, a dispersant, and a dispersion medium, dispersing conditions, filtering conditions, and the like.

A dispersant may be further contained in the second ink containing a pigment or the first ink in order to enhance the dispersibility of the pigment. Examples of the dispersant include hydroxyl group-containing carboxylic acid esters, salts of long-chain polyaminoamides and high molecular weight acid esters, salts of high molecular weight polycarboxylic acids, salts of long-chain polyaminoamides and polar acid esters, high molecular weight unsaturated acid esters, high molecular weight copolymers, modified polyurethanes, modified polyacrylates, polyether ester-type anionic active agents, naphthalenesulfonic acid formalin condensate salts, aromatic sulfonic acid formalin condensate salts, polyoxyethylene alkyl phosphoric acid esters, polyoxyethylene nonyl phenyl ethers, and stearylamine acetates. Examples of commercially available dispersants include Solsperse series from Avecia Biotechnology, Inc. and PB series from Ajinomoto Fine-Techno Co., Inc.

A dispersing aid may be further contained in the second ink containing a pigment or the first ink, as necessary. The dispersing aid may be selected depending on the types of pigment.

The total amount of the dispersant and the dispersing aid is preferably 1 to 50% by mass with respect to the pigment.

A dispersion medium for dispersing a pigment may be further contained in the second ink containing a pigment or the first ink, as necessary. In order to satisfactorily dispersing the pigment, the photopolymerizable compound as described above (particularly, a monomer having low viscosity) is preferably used as a dispersion medium.

(Other Components)

Other components may be further contained in the first ink and the second ink, as necessary. The other components may be various additives and other resins. Examples of the additives include surfactants, sensitizing aids, leveling agents, matting agents, UV absorbers, IR absorbers, antibacterial agents, and basic compounds for increasing the storage stability of the ink. Examples of the basic compounds include basic alkali metal compounds, basic alkali earth metal compounds, and basic organic compounds such as amines. Examples of the other resins include resins for adjusting the physical properties of a cured film, and examples thereof include polyester resins, polyurethane resins, vinyl resins, acrylic resins, rubber resins, and waxes. In addition, nanoparticles and the like may be contained in the second ink in order to enhance the coating texture.

(Physical Properties of Active Ray Curable Ink)

The active ray curable ink used as the first ink undergoes temperature-induced reversible sol-gel phase transition. Incidentally, the physical properties of the first ink will be hereinafter described; however, in a case where the second ink contains a gelling agent and the second ink is discharged from the inkjet recording head, the second ink also may have the same physical properties. The active ray curable ink which undergoes sol-gel phase transition is in a liquid (sol) state at a high temperature (for example, about 80° C.), and thus the ink can be discharged in a sol state when it is discharged from the inkjet recording head. When the active ray curable ink is discharged at a high temperature, ink droplets (dots) are landed on the recording medium and then undergo gelation by natural cooling. Consequently, combining of adjacent dots is suppressed and thus the image quality can be improved.

In order to improve the discharging properties of the ink droplets, the viscosity of the ink at a high temperature is preferably equal to or lower than a certain value. Specifically, the viscosity at 80° C. of the active ray curable ink is preferably 3 to 20 mPa·s. On the other hand, in order to suppress the combining of adjacent dots, the viscosity of the ink at normal temperature after landing is preferably equal to or higher than a certain value. Specifically, the viscosity at 25° C. of the active ray curable ink is preferably 1000 mPa·s or more.

The gelation temperature of the ink is preferably 40° C. or higher but 70° C. or lower and more preferably 50° C. or higher but 65° C. or lower. Since there are many cases where the discharge temperature is near 80° C., when the gelation temperature of the ink is set to 70° C. or lower, the ink can be discharged in a sol state during discharging and the discharging of the ink is easily stabilized. On the other hand, when the gelation temperature is set to 40° C. or higher, the ink after landed on the recording medium is easy to undergo quick gelation. The gelation temperature indicates a temperature when fluidity is lowered by gelation of the ink in a sol state in a process of cooling the sol-state ink.

The viscosities at 80° C. and 25° C. of the ink and the gelation temperature thereof can be obtained by measuring a temperature change in dynamic viscoelasticity of the ink using a rheometer. Specifically, a temperature change curve of the viscosity when the ink is heated to 100° C. and cooled to 20° C. with the conditions including a shear rate of 11.7 (/s) and a temperature decrease rate of 0.1° C./s is obtained. Further, the viscosity at 80° C. and the viscosity at 25° C. can be obtained by reading each of the viscosities at 80° C. and 25° C. in a temperature change curve of the viscosity. The gelation temperature can be defined as a temperature at which the viscosity is greatly changed in the temperature change curve of the viscosity and can be defined as a temperature at which the viscosity becomes 500 mPa·s, for example.

As the rheometer, a stress control type rheometer, Physica MCR series, manufactured by Anton Paar GmbH can be used. The diameter of the corn plate can be set to 75 mm, and the corn angle can be set to 1.0°.

The active ray curable ink according to the present invention may contain a liquid compound that is inactive against active rays. This liquid compound exists as a liquid in an ink film after irradiation with active rays; however, the liquid compound volatizes from the surface of the ink film or penetrates into the recording medium, whereby the thickness of the film is gradually decreased. As the thickness is decreased, irregularities or level differences in the surface of the film are also reduced. For these reasons, when this liquid compound is contained, it is possible to increase the smoothness of an image and to increase surface gloss. In addition, when the active ray curable ink according to the present invention contains this liquid compound, the ink components easily enter the recording medium, together with the liquid compound, and the adhesion between the recording medium and the printed image can be increased. Furthermore, when the first ink contains this liquid compound, the surface of the first ink is further smoothened, and thus affinity between the first ink and the second ink is enhanced.

(Method for Preparing Ink)

The first active ray curable ink is obtained by mixing the colorant, the gelling agent, the photopolymerizable compound, and the photoinitiator with other components, which are added as necessary, under heating conditions. The first active ray curable ink may be obtained by preparing a pigment dispersant in which the colorant (particularly, a pigment) is dispersed in a part of the photopolymerizable compound and mixing the pigment dispersant with other ink components. The obtained ink is preferably filtrated with a predetermined filter.

The second active ray curable ink is obtained by mixing the photopolymerizable compound and the photoinitiator with the gelling agent, the colorant, or the like, which is added as necessary, under heating conditions. In the case of using the colorant, the second active ray curable ink may be obtained by preparing a pigment dispersant in which the colorant (particularly, a pigment) is dispersed in a part of the photopolymerizable compound and mixing the pigment dispersant with other ink components. The obtained ink is preferably filtrated with a predetermined filter.

2. Image Forming Method and Apparatus (Image Forming Method)

The image forming method of the present invention includes at least the following four steps:

(1) a first step of applying a first active ray curable ink to a recording medium;

(2) a second step of irradiating the first ink with an active ray to cure and fix the first ink;

(3) a third step of additionally applying a second active ray curable ink; and (4) a fourth step of irradiating the second ink with an active ray.

In the image forming method of the present invention, (4) the fourth step, that is, the step of irradiating the second ink with an active ray is performed in a state where the cured and fixed first ink is heated. When the cured and fixed first ink is set to be in a heated state, the movement of the polymerizable molecule contained in the cured first ink becomes intense so that the gelling agent is easily dissolved. For this reason, it is considered that affinity between the first ink and the second ink is enhanced.

The method of setting the cured and fixed first ink to be in a heated state is not particularly limited. For example, a step of heating the cured and fixed first ink can be provided at any steps of the present invention. As the step of heating the cured and fixed first ink, a step of heating the recording medium by various heaters or the like may be provided or a step of heating the cured and fixed first ink by irradiating the surface of the first ink with an infrared ray may be provided. The recording medium may be heated from the side of the surface where the first ink is cured and fixed or the recording medium may be heated from the side of the surface opposite to the surface where the first ink is cured and fixed and then heat may be transferred to the surface side where the first ink is present. The order of performing the step of heating the first ink is not particularly limited. For example, the heating step may be performed between the second step and the third step, between the third step and the fourth step, or at the same time of the fourth step. Further, the present invention may include plural times of heating step.

At this time, the cured and fixed first ink may be set to be in a state where at least the surface thereof is heated.

(1) First Step

The first step is to apply the first active ray curable ink, which contains a colorant, a gelling agent, a photopolymerizable compound, and a photoinitiator and undergoes temperature-induced reversible sol-gel phase transition, to a recording medium. The method of applying the first ink is not particularly limited. For example, the ink can be applied by discharging the liquid droplets of the first active ray curable ink onto the recording medium by using an inkjet recording apparatus.

In a case where ink droplets are discharged from an inkjet recording head portion of the inkjet recording apparatus, when the temperature of the ink in the inkjet recording head is set to a temperature higher than the gelation temperature of the ink by 10 to 30° C., discharging properties of the ink droplets can be enhanced. When the temperature of the ink in the inkjet recording head is set to the gelation temperature+10° C. or higher, gelation of the ink in the inkjet recording head or on the nozzle surface is suppressed, and discharging of the ink droplets is easily stabilized. On the other hand, when the temperature of the ink in the inkjet recording head is set to the gelation temperature+30° C. or lower, the deterioration of ink components caused by an increase in temperature of the ink can be prevented.

The ink can be heated by the inkjet recording head of the inkjet recording apparatus, an ink channel connected to the inkjet recording head, an ink tank connected to the ink channel, or the like.

The amount of liquid per droplet discharged from each nozzle of the inkjet recording head may vary depending on the resolution of an image; however, the amount thereof is preferably 0.5 to 10 pl, and for forming a high-resolution image, the amount thereof is more preferably 0.5 to 2.5 pl. In order to form a high-resolution image with such a liquid droplet amount, droplets of the ink after landing are not combined, that is, sufficient sol-gel phase transition of the ink is necessary. In the active ray curable ink, the sol-gel phase transition occurs immediately. Accordingly, it is possible to stably form a high-resolution image even with such a liquid droplet amount.

The ink droplets landed on the recording medium are cooled and quickly undergo gelation by sol-gel phase transition. As a result, the ink droplets can be pinned without spread of the ink droplets. Furthermore, since it is less likely that oxygen enters the ink droplets, curing of the photopolymerizable compound is less likely to be inhibited by oxygen.

The recording medium may be either paper or a resin film. Examples of the paper include coated paper for printing and coated paper B for printing. In addition, examples of the resin film include a polyethylene terephthalate film, a polypropylene film, and a vinyl chloride film. In particular, the recording medium is preferably formed by a material which has high affinity with the liquid compound and into which the liquid compound is easily impregnated.

Herein, by allowing the first ink to be discharged from the inkjet recording head, the first ink is applied onto the recording medium. By setting the temperature of the recording medium when the ink droplets are landed to a temperature lower than the gelation temperature of the ink by 10 to 20° C., it is possible to achieve both a moderate level of leveling that does not allow for mixing among adjacent dots of the ink and appropriate pinning.

The first step may be performed in any of a single pass manner or a scanning manner; however, when the single pass manner is employed, the image forming speed can be increased.

The conveyance speed of the recording medium can be set to a value from 1 to 120 m/s, for example. As the conveyance speed increases, the image forming speed also increases. In particular, according to the method of the present invention, adhesiveness between the inks can be enhanced even at an extremely high linear speed, that is, a linear speed of 50 to 120 m/min, which is applicable to a single pass inkjet image forming method.

(2) Second Step

The second step is to cure and fix the first ink by irradiating the first ink with an active ray. At this time, by irradiating the first active ray curable ink with an active ray, the first ink can be cured and fixed by cross-linking or polymerizing the photopolymerizable compound contained in the first ink.

The active ray with which the first active ray curable ink applied to the recording medium is irradiated can be an ultraviolet ray from an LED light source. Specific examples thereof include 395 nm, Water Cooled LED manufactured by Phoseon Technology. Examples of a general UV light source include metal halide lamps. Use of an LED as a light source can prevent the ink from being melted by radiation heat of the light source, that is, can prevent poor curing from occurring at the surface of the cured film of the ink.

The irradiation condition of the active ray can be appropriately set depending on the types of the first active ray curable ink. For example, it is possible to install an LED light source having a maximum illuminance in a wavelength range of 385 to 410 nm such that the maximum illuminance on the surface of the applied first ink becomes 0.5 to 10.0 W/cm2 and more preferably 1 to 5 W/cm2. The quantity of light quantity with which an image is irradiated may be adjusted to be less than 350 mJ/cm2. Incidentally, regarding the irradiation with the active ray, since the thickness of the ink is in the range in which the thickness can be ignored, the adjustment of the maximum illuminance on the surface of the applied first ink may be performed by adjusting the maximum illuminance on the surface of the recording medium.

When the conveyance speed of the recording medium is set to the same speed as in the first step, efficient printing can be carried out. Further, the second step and the steps subsequent thereto may also be performed at the same speed. The conveyance speed can be set, for example, to a value from 1 to 120 m/s, or may be set to an extremely high linear speed, that is, a linear speed of 50 to 120 m/min, which is applicable to the single pass inkjet image forming method. Since the ink is rapidly cooled at such a speed to undergo gelation, the photopolymerizable compound cannot be polymerized while the gelling agent is dissolved, and the precipitated gelling agent is easily localized in the vicinity of the surface of the cured ink. However, in the method of the present invention, since such a gelling agent precipitated on the surface can be dissolved in the polymerizable compound, affinity between the inks can be enhanced even at such a speed.

(3) Third Step

The third step is to additionally apply the second active ray curable ink containing a photopolymerizable compound and a photoinitiator. The second active ray curable ink can be applied to the surface, to which the first active ray curable ink is applied, of the recording medium. Furthermore, the second active ray curable ink can also be applied to the upper surface of the cured first active ray curable ink. The method of applying the second active ray curable ink is not particularly limited. For example, the second active ray curable ink can be applied by appropriately selecting a method from inkjet discharging, a roll coating method, a curtain flow method, a spin coating method, an air spray method, an airless spray method, and the like.

(4) Fourth Step

The fourth step is to irradiate the second ink with an active ray. By irradiating the second active ray curable ink with an active ray, the photopolymerizable compound contained in the second ink is cross-linked or polymerized so that the second ink can be cured.

The irradiation condition of the active ray can be appropriately set depending on the types of the second active ray curable ink. The irradiation may be performed by using an LED light source having a maximum illuminance in a wavelength range of 385 to 410 nm under the condition that the maximum illuminance becomes 0.5 to 10.0 W/cm2, or may be performed by using a metal halide lamp of about 120 W/cm at an illuminance of about 200 to 300 mJ/cm2.

(Inkjet Recording Apparatus)

The image forming method of the present invention can be performed by using an inkjet recording apparatus of active ray curable inkjet type. The inkjet recording apparatus of active ray curable inkjet type includes a line recording type (single pass recording type) illustrated in FIG. 1 and FIG. 2 and a serial recording type illustrated in FIG. 3. The type of the inkjet recording apparatus may be suitably selected depending on desired resolution of an image or recording speed; however, from the viewpoint of high-speed recording, the line recording type (single pass recording type) is preferable.

FIG. 1 is a diagram illustrating an example of the configuration of main parts of a line recording type inkjet recording apparatus. FIG. 1A is a side view and FIG. 1B is a top view.

In an example illustrated in FIG. 1, an inkjet recording apparatus 10 includes: head carriages 16 for accommodating a plurality of inkjet recording heads 14; an ink channel 30 connected to the head carriage 16; an ink tank 31 for storing the ink to be supplied through the ink channel 30; a first active ray irradiation unit 18 which covers the entire width of the recording medium 12 and is arranged at a downstream side of the head carriage 16 (conveyance direction of the recording medium); a second active ray curable ink discharging unit 40 arranged at a downstream side of the first active ray irradiation unit 18; an infrared irradiation unit 60 arranged at a downstream side of the second active ray curable ink discharging unit 40; and a second active ray irradiation unit 70 arranged at a downstream side of the second active ray curable ink discharging unit 40 and the infrared irradiation unit 60.

The head carriage 16 is fixedly arranged so as to cover the entire width of the recording medium 12 and accommodates the plurality of inkjet recording heads 14 that are installed for each color to be applied. The inkjet recording head 14 is designed to receive ink. For example, an ink may be supplied from an ink cartridge or the like (not illustrated)

that is detachably attached to the inkjet recording apparatus 10 either directly or by an ink supplying means (not illustrated).

A plurality of the inkjet recording heads 14 are arranged for each color in the conveyance direction of the recording medium 12. The number of the inkjet recording heads 14 to be arranged in the conveyance direction of the recording medium 12 is set based on the nozzle density of inkjet recording head 14 and the resolution of a printed image. For example, when an image having a resolution of 1440 dpi is formed by using the inkjet recording head 14 with a liquid droplet amount of 2 pl and a nozzle density of 360 dpi, four inkjet recording heads 14 may be arranged in a staggered manner relative to the conveyance direction of the recording medium 12. Further, when an image having a resolution of 720×720 dpi is formed by using the inkjet recording head 14 with a liquid droplet amount of 6 pl and a nozzle density of 360 dpi, two inkjet recording heads 14 may be arranged in a staggered manner. dpi represents the number of ink droplets (dots) per 2.54 cm.

The ink tank 31 is connected to the head carriage 16 through the ink channel 30. The ink channel 30 is a passage for supplying an ink in the ink tank 31 to the head carriage 16. For stable discharge of ink droplets, the ink present in the ink tank 31, the ink channel 30, the head carriage 16, and the inkjet recording head 14 may be heated to a predetermined temperature to maintain a gel state.

The first active ray irradiation unit 18 covers the entire width of the recording medium 12 and is arranged at a downstream side of the head carriage 16 relative to the conveyance direction of the recording medium. The first active ray irradiation unit 18 irradiates the liquid droplets, which have been discharged from the inkjet recording head 14 and landed on the recording medium, with light so as to cure the liquid droplets.

The second active ray curable ink discharging unit 40 is fixedly arranged so as to cover the entire width of the recording medium 12 and includes a coating port 42 used for applying the second active ray curable ink to the recording medium. The coating port 42 is configured such that the second active ray curable ink is supplied thereto. For example, an ink may be supplied from an ink cartridge or the like (not illustrated) that is detachably attached to the inkjet recording apparatus 10 either directly or by an ink supplying means (not illustrated).

An ink tank 51 is connected to the second active ray curable ink discharging unit 40 through an ink channel 50. The ink channel 50 is a passage for supplying an ink in the ink tank 51 to the second active ray curable ink discharging unit 40. For stable discharge of ink droplets, the ink present in the ink tank 51, the ink channel 50, and the second active ray curable ink discharging unit 40 may be heated to a predetermined temperature to maintain a gel state.

The infrared irradiation unit 60 is arranged so as to cover the entire width of the recording medium 12. The infrared irradiation unit 60 is set to perform irradiation with an infrared ray such that at least the vicinity of the surface of the surface side where the cured and fixed first ink of the recording medium is cured and fixed can be heated, and after the second active ray curable ink is discharged by the discharging unit 40 and then landed on a recording medium, the infrared irradiation unit performs irradiation with an infrared ray while performing positioning and heats the cured and fixed first ink. As illustrated in FIG. 1A, the infrared irradiation unit 60 may be arranged at a downstream side of the second active ray curable ink discharging unit 40 or may be arranged between the first active ray irradiation unit 18 and the second active ray curable ink discharging unit 40.

Incidentally, the infrared irradiation unit 60 may be arranged between the first active ray irradiation unit 18 and the second active ray curable ink discharging unit 40. At this time, the irradiation condition for heating the first ink is set such that the first ink which is cured and fixed at the time point of the next irradiation with a second active ray is sufficiently heated. At this time, the irradiation condition can also be set such that at least the surface of the first ink is heated.

The second active ray irradiation unit 70 covers the entire width of the recording medium 12 and is arranged at a downstream side of the second active ray curable ink discharging unit 40 and the infrared irradiation unit 60 relative to the conveyance direction of the recording medium. The second active ray irradiation unit 70 irradiates liquid droplets, which have been discharged by the second active ray curable ink discharging unit 40 and landed on a recording medium, with light so as to cure the liquid droplets.

Incidentally, a means for heating the cured and fixed first ink is not limited to the infrared irradiation unit 60. For example, as illustrated in FIG. 2, heating may be performed from the rear side of the recording medium by the heating unit 19, such as a heater, arranged at the lower surface of the recording medium 12 so that heat is transferred to the surface of the first ink. In an example illustrated in FIG. 2A, which is a side view of such an aspect, heating may be performed before the second active ray curable ink is discharged (heating unit 19a), heating may be performed after the second active ray curable ink is discharged (heating unit 19b), or heating may be performed when the second active ray irradiation unit 70 cures the second active ray curable ink (heating unit 19c).

FIG. 3 is a top view illustrating an example of the configuration of main parts of a serial recording type inkjet recording apparatus 20. As illustrated in FIG. 3, the inkjet recording apparatus 20 can be configured in the same manner as in FIG. 1 or FIG. 2, except that the inkjet recording apparatus 20 includes: a head carriage 26, which has a width narrower than the entire width of the recording medium and accommodates a plurality of inkjet recording heads 24, instead of the head carriage 16 which is fixedly arranged so as to cover the entire width of the recording medium; and a guide unit 27 for moving the head carriage 26 in the width direction of the recording medium 12.

In the serial recording type inkjet recording apparatus 20, the head carriage 26 discharges the ink droplets from the inkjet recording head 24 accommodated in the head carriage 26 while moving along the guide unit 27 in the width direction of the recording medium 12. Once the head carriage 26 moves completely in the width direction of the recording medium. 12 (for each pass), the recording medium. 12 is delivered in the conveyance direction. Then, the first ink is cured by the first active ray irradiation unit 28. Thereafter, the second active ray curable ink is discharged from the second active ray curable ink discharging unit 40, and the second ink is cured by the second active ray irradiation unit 70 in a state where the first ink is heated. At this time, similarly to FIG. 1, the first ink may be heated by the infrared irradiation unit 60, or similarly to FIG. 2, the first ink may be heated by the heating unit 19. Except those operations, an image can be recorded in almost the same manner as the aforementioned line recording type inkjet recording apparatus 10.

EXAMPLES

Hereinafter, the present invention will be described in more detail with reference to Examples; however, it is not understood that the scope of the present invention is limited to the description of Examples.

Active ray curable inks of each of Examples and Comparative Examples were prepared based on the following components.

(Photopolymerizable Compound)

[(Meth)Acrylate Compound Having C Log P Value of 4.0 to 7.0]

Miramer M360 (manufactured by Miwon Specialty Chemical Co., Ltd.): 3PO modified trimethylolpropane triacrylate (molecular weight: 471, C log P value: 4.90)

Miramer M166 (manufactured by Miwon Specialty Chemical Co., Ltd.): 8EO modified nonylphenol acrylate (molecular weight: 626, C log P value: 6.42)

NK ESTER DOD-N (manufactured by Shin Nakamura Chemical Co., Ltd.): 1,10-decanediol dimethacrylate (molecular weight: 310, C log P value: 5.75)

NK ESTER A-DCP (manufactured by Shin Nakamura Chemical Co., Ltd.): tricyclodecane dimethanol diacrylate (molecular weight: 304, C log P value: 4.69)

[Other Photopolymerizable Compound]

NK ESTER APG-100 (manufactured by Shin Nakamura Chemical Co., Ltd.): dipropylene glycol diacrylate STA (manufactured by Osaka Organic Chemical Industry Ltd.): octadecyl acrylate (molecular weight: 325, melting point: 30° C.)

NK ESTER A-TMM-3L (manufactured by Shin Nakamura Chemical Co., Ltd.): tetramethylolmethane triacrylate SR355 (manufactured by Sartomer Company, Inc.): ditrimethylolpropane tetraacrylate GENOMER 3414 (manufactured by RAHN AG): polyester acrylate SR230 (manufactured by Sartomer Company, Inc.): diethylene glycol diacrylate NK ESTER A-9550 (manufactured by Shin Nakamura Chemical Co., Ltd.): dipentaerythritol polyacrylate ETERCURE 6234 (manufactured by Eternal Chemical Co., Ltd.): epoxy acrylate oligomer OTA480 (manufactured by DAICEL-CYTEC Company, Ltd.): glycerin propoxy acrylate NK ESTER A-9300 (manufactured by Shin Nakamura Chemical Co., Ltd.): isocyanurate triacrylate (molecular weight: 423, melting point: 53° C.)

(Gelling Agent)

NISSAN ELECTOL (registered trademark) WEP-2 (manufactured by NOF CORPORATION): ester wax, melting point: 60° C.

KAO Wax T1 (manufactured by Kao Corporation): distearyl ketone

UNISTAR M-9676 (manufactured by NOF CORPORATION): stearyl stearate

NISSAN ELECTOL (registered trademark) WEP-4 (manufactured by NOF CORPORATION): ester wax, melting point: 70° C.

SLIAID S (manufactured by Nippon Kasei Chemical Co., Ltd.): stearamide ethyl stearate (Surfactant)

BYK-307 (manufactured by BYK)

(Photoinitiator)

IRGACURE 819 (manufactured by BASF)

DETX (manufactured by Lambson Ltd.)

IRGACURE 369 (manufactured by BASF)

IRGACURE 907 (manufactured by BASF)

(Sensitizing Aid)

Speedcure EHA (manufactured by Lambson Ltd.) tertiary amine compound (Polymerization Inhibitor)

Irgastab UV-10 (manufactured by Ciba)

(Others)

NANOBYK-3601 (manufactured by BYK) alumina nanoparticle, solid content: 30%, solvent: tripropylene glycol diacrylate (Preparation of Pigment Dispersion a)

Two kinds of compounds described below were put into a stainless steel beaker. These compounds were heated and stirred for 1 hour while being heated on a hot plate set at 65° C.

EFKA4130 (manufactured by BASF): 9 parts by mass

Dipropylene glycol diacrylate (APG-100, manufactured by Shin Nakamura Chemical Co., Ltd., molecular weight: 242): 71 parts by mass The mixed solution was cooled to room temperature and a pigment described below was further added thereto. This solution was put and sealed together with 200 g of zirconia beads having a diameter of 0.5 mm into a glass bottle, followed by dispersion treatment for 5 hours using a paint shaker. Thereafter, the zirconia beads were removed to obtain a pigment dispersion a.

Pigment Black 7 (manufactured by Mitsubishi Chemical Corporation, MA7): 20 parts by mass (Preparation of Pigment Dispersion b)

Two kinds of compounds described below were put into a stainless steel beaker. These compounds were heated and stirred for 1 hour so as to be dissolved while being heated on a hot plate set at 65° C.

EFKA4130 (manufactured by BASF): 9 parts by mass

Dipropylene glycol diacrylate (APG-100, manufactured by Shin Nakamura Chemical Co., Ltd., molecular weight: 242): 50 parts by mass The mixed solution was cooled to room temperature and a pigment described below was further added thereto. This solution was put and sealed together with 200 g of zirconia beads having a diameter of 0.5 mm into a glass bottle, followed by dispersion treatment for 8 hours using a paint shaker. Thereafter, the zirconia beads were removed to obtain a pigment dispersion b.

Titanium oxide (manufactured by ISHIHARA SANGYO KAISHA, LTD., CR-EL): 41 parts by mass (Preparation of First Active Ray Curable Inks A-1 to A-6)

Respective compounds were mixed at composition ratios presented in the following Table 1 and the mixed solution was heated at 80° C. under stirring to produce each of first active ray curable inks A-1 to A-6 that undergo sol-gel phase transition. The obtained inks were filtered with a 3-μm membrane filter made of Teflon (registered trademark) manufactured by ADVANTEC. Similarly, respective compounds were mixed at composition ratios presented in the following Table 1 and the mixed solution was heated at 50° C. under stirring to produce each of active ray curable inks to be additionally applied. Thereafter, similarly, the obtained inks were filtered with a 3-μm membrane filter made of Teflon (registered trademark) manufactured by ADVANTEC. The unit of components in Table 1 is part(s) by mass.

TABLE 1

| Composition of first ink | | A-1 | A-2 | A-3 | A-4 | A-5 | A-6 |
|---|---|---|---|---|---|---|---|
| Pigment dispersant | a | 12.5 | 12.5 | 12.5 | 12.5 | 12.5 | 12.5 |
| Polymerizable compound | NK ESTER APG-100 | 25.0 | 23.2 | 19.0 | 18.2 | 20.1 | 27.2 |
| | STA | 7.0 | 7.0 | — | — | — | — |
| | NK ESTER A-TMM-3L | 20.0 | 20.0 | 15.0 | — | — | — |
| | SR355 | 15.0 | 15.0 | — | 13.0 | — | — |
| | GENOMER 3414 | 7.0 | 7.0 | — | — | 7.0 | 7.0 |
| | SR230 | — | — | 5.0 | — | — | — |
| | NK ESTER A-9550 | — | — | 10.0 | 13.0 | 10.0 | 10.0 |
| | ETERCURE 6234 | — | — | 5.0 | 5.0 | 7.0 | 5.0 |
| | OTA480 | — | — | — | — | 15.0 | — |
| | NK ESTER A-9300 | — | — | — | — | — | 5.0 |
| Polymerizable compound (C log P: 4.0 to 7.0) | Miramer M360 | — | — | 20.0 | 15.0 | — | — |
| | Miramer M166 | — | — | — | 10.0 | — | — |
| | NK ESTER DOD-N | — | — | — | — | 15.0 | — |
| | NK ESTER A-DCP | — | — | — | — | — | 20.0 |
| Gelling agent | WEP-2 | 2.2 | — | 2.2 | 0.8 | 0.8 | — |
| | KAO Wax T1 | — | — | — | 1.2 | — | — |
| | UNISTAR M-9676 | — | — | — | — | 1.3 | 1.0 |
| | WEP-4 | — | — | — | — | — | 1.0 |
| | SLIAID S | — | 4.0 | — | — | — | — |
| Surfactant | BYK-307 | 0.1 | 0.1 | 0.1 | 0.1 | 0.1 | 0.1 |
| Photoinitiator | IRGACURE 819 | 4.0 | 4.0 | 4.0 | 4.0 | 4.0 | 4.0 |
| | IRGACURE 369 | 3.0 | 3.0 | 3.0 | 3.0 | 3.0 | 3.0 |
| | DETX | 2.0 | 2.0 | 2.0 | 2.0 | 2.0 | 2.0 |
| Sensitizing aid | Speedcure EHA | 2.0 | 2.0 | 2.0 | 2.0 | 2.0 | 2.0 |
| Polymerization inhibitor | UV-10 | 0.2 | 0.2 | 0.2 | 0.2 | 0.2 | 0.2 |
| Total | | 100.0 | 100.0 | 100.0 | 100.0 | 100.0 | 100.0 |

(Preparation of Second Active Ray Curable Inks B-1 to B-4)

Similarly, respective compounds were mixed at composition ratios presented in the following Table 2 and the mixed solution was heated at 50° C. under stirring to produce each of second active ray curable inks B-1 to B-4. Thereafter, similarly, the obtained inks were filtered with a 3-µm membrane filter made of Teflon (registered trademark) manufactured by ADVANTEC. The unit of components in Table 2 is part (s) by mass.

TABLE 2

| Composition of second ink | | B-1 | B-2 | B-3 | B-4 |
|---|---|---|---|---|---|
| Pigment dispersant | a | — | — | — | 12.5 |
| | b | — | — | 30.5 | — |
| Polymerizable compound | NK ESTER APG-100 | 42.4 | 22.4 | 12.1 | 26.4 |
| | NK ESTER A-TMM-3L | 20.0 | 20.0 | 20.0 | 20.0 |
| | SR355 | 10.0 | 10.0 | 10.0 | 10.0 |
| | GENOMER 3414 | 10.0 | 10.0 | 5.0 | 5.0 |
| | NK ESTER A-9550 | 10.0 | 10.0 | 15.0 | 15.0 |
| Nanoparticle | NANOBYK-3601 | — | 20.0 | — | — |
| Surfactant | BYK-307 | 0.1 | 0.1 | 0.1 | 0.1 |
| Photoinitiator | IRGACURE 819 | — | — | 4.0 | 4.0 |
| | IRGACURE 369 | 2.0 | 2.0 | 2.0 | 2.0 |
| | DETX | 0.5 | 0.5 | 0.3 | 0.3 |
| | IRGACURE 907 | 4.0 | 4.0 | — | — |
| Sensitizing aid | KayacureEPA (Nippon Kayaku Co., Ltd.) | 1.0 | 1.0 | 1.0 | 2.0 |
| Polymerization inhibitor | UV-10 | 0.1 | 0.1 | 0.1 | 0.1 |
| Total | | 100.0 | 100.0 | 100.0 | 100.0 |

(Image Formation)

Any one of the inks A-1 to A-6 described in Table 1 was charged in an inkjet recording apparatus having an inkjet recording head that is equipped with a piezo type inkjet nozzle. The ink was discharged from this apparatus to A4-sized coat paper (OK Topcoat; manufactured by Oji Paper Co., Ltd.) to form a solid image.

The ink supply system was configured to include an ink tank, an ink channel, a sub-ink tank immediately before the inkjet recording head, a filter-attached pipe, and a piezo head. In the inkjet recording apparatus, four piezo heads having a resolution of 360 dpi were arranged in the conveyance direction and the recording resolution was set to 1440×1440 dpi.

The ink from the ink tank to the head portion was warmed to 100° C. Further, a voltage was applied to the piezo head such that each liquid droplet amount became 3 pl so as to form a solid image of monochrome.

After the image was formed, the ink was cured by irradiating the ink with light having a wavelength of 395 nm from a Water Cooled LED Lamp manufactured by Heraeus Holding. The distance from the surface of the LED lamp to the surface of the recording medium was set to 50 mm. At this time, the maximum illuminance on the surface of the recording medium was set to 3.5 W/cm2 and the conveyance speed of the recording medium was set to 60 m/min. The irradiated light quantity was 400 mJ/cm2. For comparison, a case where the distance from the surface of the LED lamp to the surface of the recording medium was set to 10 mm (at this time, the maximum illuminance on the recording medium was 6 W/cm2) and a case where the conveyance speed of the recording medium was set to 30 m/min were also performed. The measurement of the light quantity was performed by using UV power meters C9536 and H9958 manufactured by Hamamatsu Photonics K.K.

Thereafter, by using any one of the inks B-1 to B-4 described in Table 2, solid images were formed using one piezo head having a resolution of 360 dpi on the cured and fixed solid printed article by applying a voltage to the piezo head such that the liquid droplet amount became 40 pl. The obtained images were used as samples. After the ink was landed on the surface of the printed article, the surface heating was performed by using an IR dryer (GraphiSet 4 (GS4) manufactured by Baldwin Technology Company, Inc.) at an output of 80% of the dryer. Thereafter, the second ink was cured by irradiation with light having a maximum illuminance on the image surface of 280 mW/cm2 using a metal halide lamp (120 W/cm) manufactured by GS Yuasa Corporation. The conveyance speed of the recording medium was set to 30 m/min. The irradiated light quantity was 350 mJ/cm2. For comparison, a sample cured by UV irradiation without IR irradiation was also produced.

The surface heating was performed on the printed article in which images were formed by using the inks A-1 to A-6 described in Table 1 and cured and fixed by irradiation with an LED lamp, by using an IR dryer (GraphiSet 4 (GS4) manufactured by Baldwin Technology Company, Inc.) at an output of 100% of the dryer. Thereafter, by using the inks B-2 and B-3 described in Table 2, solid images were formed using one piezo head having a resolution of 360 dpi by applying a voltage to the piezo head such that the liquid droplet amount became 40 pl. Then, the second ink was cured by irradiation with light having a maximum illuminance on the image surface of 280 mW/cm2 using a metal halide lamp (120 W/cm) manufactured by GS Yuasa Corporation. The conveyance speed of the recording medium was set to 30 m/min. The irradiated light quantity was 350 mJ/cm2.

Regarding the respective samples, the combination of the first ink and the second ink, the exposure condition at the time of curing the first ink, the conveyance speed (linear speed) of the recording medium at the time of curing the first ink, the heating timing, and whether or not the IR irradiation is performed are presented in Table 3 and Table 4.

Incidentally, in Table 3 and Table 4, the active ray curable inks used as the first ink in Sample Nos. 1 and 2 (respectively referred to as Comparison 1 and Comparison 2) are the first ink described in Patent Literature 1 and Ink No. 4 described in Patent Literature 2, respectively. Further, the active ray curable ink used as the second ink in Sample No. 3 (referred to as Comparison 3) is the overcoat composition B described in Patent Literature 3. The inks of Comparison 1, Comparison 2, and Comparison 3 contained a gelling agent in an amount of more than 5.0% by mass.

Further, in Table 3 and Table 4, whether the surface heating was performed before or after the image formation by using the second ink was described in the section "Surface heating." In a case where the surface heating was performed before the image formation by using the second ink, "Before" is described in the section "Surface heating" and in a case where the surface heating was performed after the image formation by using the second ink, "After" is described in the section "Surface heating."

TABLE 3

| Sample No. | First ink | Exposure | Linear speed | Second ink | Surface heating | IR irradiation |
|---|---|---|---|---|---|---|
| 1 | Comparison 1 | 3.5 W/cm², 50 mm | 60 m/s | B-1 | After | Performed |
| 2 | Comparison 2 | 3.5 W/cm², 50 mm | 60 m/s | B-1 | After | Performed |
| 3 | A-1 | 3.5 W/cm², 50 mm | 60 m/s | Comparison 3 | After | Performed |
| 4 | A-1 | 3.5 W/cm², 50 mm | 60 m/s | B-1 | After | Not performed |
| 5 | A-2 | 3.5 W/cm², 50 mm | 60 m/s | B-1 | After | Not performed |
| 6 | A-3 | 3.5 W/cm², 50 mm | 60 m/s | B-1 | After | Not performed |
| 7 | A-4 | 3.5 W/cm², 50 mm | 60 m/s | B-1 | After | Not performed |
| 8 | A-5 | 3.5 W/cm², 50 mm | 60 m/s | B-1 | After | Not performed |
| 9 | A-6 | 3.5 W/cm², 50 mm | 60 m/s | B-1 | After | Not performed |
| 10 | A-1 | 3.5 W/cm², 50 mm | 60 m/s | B-2 | After | Not performed |
| 11 | A-1 | 3.5 W/cm², 50 mm | 60 m/s | B-3 | After | Not performed |
| 12 | A-1 | 3.5 W/cm², 50 mm | 60 m/s | B-4 | After | Not performed |
| 13 | A-1 | 3.5 W/cm², 50 mm | 60 m/s | B-1 | After | Performed |
| 14 | A-2 | 3.5 W/cm², 50 mm | 60 m/s | B-1 | After | Performed |
| 15 | A-3 | 3.5 W/cm², 50 mm | 60 m/s | B-1 | After | Performed |
| 16 | A-4 | 3.5 W/cm², 50 mm | 60 m/s | B-1 | After | Performed |
| 17 | A-5 | 3.5 W/cm², 50 mm | 60 m/s | B-1 | After | Performed |
| 18 | A-6 | 3.5 W/cm², 50 mm | 60 m/s | B-1 | After | Performed |
| 19 | A-1 | 3.5 W/cm², 50 mm | 60 m/s | B-2 | After | Performed |
| 20 | A-2 | 3.5 W/cm², 50 mm | 60 m/s | B-2 | After | Performed |
| 21 | A-3 | 3.5 W/cm², 50 mm | 60 m/s | B-2 | After | Performed |
| 22 | A-4 | 3.5 W/cm², 50 mm | 60 m/s | B-2 | After | Performed |
| 23 | A-5 | 3.5 W/cm², 50 mm | 60 m/s | B-2 | After | Performed |
| 24 | A-6 | 3.5 W/cm², 50 mm | 60 m/s | B-2 | After | Performed |
| 25 | A-1 | 3.5 W/cm², 50 mm | 60 m/s | B-3 | After | Performed |
| 26 | A-2 | 3.5 W/cm², 50 mm | 60 m/s | B-3 | After | Performed |
| 27 | A-3 | 3.5 W/cm², 50 mm | 60 m/s | B-3 | After | Performed |
| 28 | A-4 | 3.5 W/cm², 50 mm | 60 m/s | B-3 | After | Performed |
| 29 | A-5 | 3.5 W/cm², 50 mm | 60 m/s | B-3 | After | Performed |
| 30 | A-6 | 3.5 W/cm², 50 mm | 60 m/s | B-3 | After | Performed |
| 31 | A-1 | 3.5 W/cm², 50 mm | 60 m/s | B-3 | After | Performed |
| 32 | A-2 | 3.5 W/cm², 50 mm | 60 m/s | B-3 | After | Performed |
| 33 | A-3 | 3.5 W/cm², 50 mm | 60 m/s | B-3 | After | Performed |
| 34 | A-4 | 3.5 W/cm², 50 mm | 60 m/s | B-3 | After | Performed |
| 35 | A-5 | 3.5 W/cm², 50 mm | 60 m/s | B-3 | After | Performed |
| 36 | A-6 | 3.5 W/cm², 50 mm | 60 m/s | B-3 | After | Performed |
| 37 | A-4 | 3.5 W/cm², 10 mm | 60 m/s | B-1 | After | Performed |
| 38 | A-5 | 3.5 W/cm², 10 mm | 60 m/s | B-1 | After | Performed |
| 39 | A-6 | 3.5 W/cm², 10 mm | 60 m/s | B-1 | After | Performed |
| 40 | A-4 | 3.5 W/cm², 50 mm | 30 m/s | B-2 | After | Performed |
| 41 | A-5 | 3.5 W/cm², 50 mm | 30 m/s | B-2 | After | Performed |
| 42 | A-6 | 3.5 W/cm², 50 mm | 30 m/s | B-2 | After | Performed |

TABLE 4

| Sample No. | First ink | Exposure | Linear speed | Second ink | Surface heating | IR irradiation |
|---|---|---|---|---|---|---|
| 43 | A-1 | 3.5 W/cm², 50 mm | 60 m/s | B-2 | Before | Performed |
| 44 | A-2 | 3.5 W/cm², 50 mm | 60 m/s | B-2 | Before | Performed |
| 45 | A-3 | 3.5 W/cm², 50 mm | 60 m/s | B-2 | Before | Performed |
| 46 | A-4 | 3.5 W/cm², 50 mm | 60 m/s | B-2 | Before | Performed |
| 47 | A-5 | 3.5 W/cm², 50 mm | 60 m/s | B-2 | Before | Performed |
| 48 | A-6 | 3.5 W/cm², 50 mm | 60 m/s | B-2 | Before | Performed |
| 49 | A-1 | 3.5 W/cm², 50 mm | 60 m/s | B-3 | Before | Performed |
| 50 | A-2 | 3.5 W/cm², 50 mm | 60 m/s | B-3 | Before | Performed |
| 51 | A-3 | 3.5 W/cm², 50 mm | 60 m/s | B-3 | Before | Performed |
| 52 | A-4 | 3.5 W/cm², 50 mm | 60 m/s | B-3 | Before | Performed |
| 53 | A-5 | 3.5 W/cm², 50 mm | 60 m/s | B-3 | Before | Performed |
| 54 | A-6 | 3.5 W/cm², 50 mm | 60 m/s | B-3 | Before | Performed |

(Evaluation of Sample)

Wettability, adhesiveness, and curability of each produced sample were evaluated as follows.

Wettability

Whether white spots (non-coating portion caused by repelling) are present in a solid image portion of the second ink was visually checked. The evaluation was carried out based on the following criteria.

○: There were no white spots.
Δ: White spots were found in one or two sites, but to a level without any problem for practical use.
x: Many white spots have occurred.

Adhesiveness

Six grid cutouts were made by a cutter on the solid image portion of the second ink at an interval of 1 mm to form a grid having 25 cells. A scotch-tape (registered trademark) manufactured by 3M was pasted on the surface of the grid, the tape was peeled off in the vertical direction, and then image remains attached to the grid were counted.

Curability (Pencil Hardness)

The solid image portion (100% printed portion) was left to stand for 24 hours under an environment at 25° C. and 60% RH. Then, the pencil hardness of the surface was measured according to JIS-K-5400. The evaluation was carried out based on the following criteria.

○: Pencil hardness of 2H or higher
Δ: Pencil hardness of B, F, and H
x: Pencil hardness of 2B or lower The evaluation results are presented in Table 5 and Table 6.

TABLE 5

| Sample No. | Wettability | Adhesiveness | Curability | Remark |
|---|---|---|---|---|
| 1 | X | 0 | Δ | Comparative Example |
| 2 | X | 0 | Δ | Comparative Example |
| 3 | ○ | 5 | X | Comparative Example |
| 4 | X | 0 | ○ | Comparative Example |
| 5 | X | 0 | ○ | Comparative Example |
| 6 | X | 0 | ○ | Comparative Example |
| 7 | X | 0 | ○ | Comparative Example |
| 8 | X | 0 | ○ | Comparative Example |
| 9 | X | 0 | ○ | Comparative Example |
| 10 | X | 0 | ○ | Comparative Example |
| 11 | X | 0 | ○ | Comparative Example |
| 12 | X | 0 | ○ | Comparative Example |
| 13 | ○ | 23 | ○ | Present Invention |
| 14 | ○ | 23 | ○ | Present Invention |
| 15 | ○ | 25 | ○ | Present Invention |
| 16 | ○ | 25 | ○ | Present Invention |
| 17 | ○ | 25 | ○ | Present Invention |
| 18 | ○ | 25 | ○ | Present Invention |
| 19 | ○ | 23 | ○ | Present Invention |
| 20 | ○ | 23 | ○ | Present Invention |
| 21 | ○ | 25 | ○ | Present Invention |
| 22 | ○ | 25 | ○ | Present Invention |
| 23 | ○ | 25 | ○ | Present Invention |
| 24 | ○ | 25 | ○ | Present Invention |
| 25 | ○ | 20 | ○ | Present Invention |
| 26 | Δ | 20 | ○ | Present Invention |
| 27 | Δ | 23 | ○ | Present Invention |
| 28 | ○ | 25 | ○ | Present Invention |
| 29 | ○ | 25 | ○ | Present Invention |
| 30 | ○ | 25 | ○ | Present Invention |
| 31 | ○ | 20 | ○ | Present Invention |
| 32 | Δ | 20 | ○ | Present Invention |
| 33 | Δ | 20 | ○ | Present Invention |
| 34 | ○ | 20 | ○ | Present Invention |
| 35 | ○ | 25 | ○ | Present Invention |
| 36 | ○ | 25 | ○ | Present Invention |
| 37 | Δ | 22 | ○ | Present Invention |
| 38 | Δ | 21 | ○ | Present Invention |
| 39 | Δ | 23 | ○ | Present Invention |
| 40 | Δ | 21 | ○ | Present Invention |
| 41 | Δ | 20 | ○ | Present Invention |
| 42 | Δ | 23 | ○ | Present Invention |

TABLE 6

| Sample No. | Wettability | Adhesiveness | Curability | Remark |
|---|---|---|---|---|
| 43 | ○ | 23 | ○ | Present Invention |
| 44 | ○ | 23 | ○ | Present Invention |
| 45 | ○ | 25 | ○ | Present Invention |
| 46 | ○ | 25 | ○ | Present Invention |
| 47 | ○ | 25 | ○ | Present Invention |
| 48 | ○ | 25 | ○ | Present Invention |
| 49 | ○ | 23 | ○ | Present Invention |
| 50 | ○ | 23 | ○ | Present Invention |
| 51 | ○ | 23 | ○ | Present Invention |
| 52 | ○ | 23 | ○ | Present Invention |
| 53 | ○ | 25 | ○ | Present Invention |
| 54 | ○ | 25 | ○ | Present Invention |

As shown in Table 5 and Table 6, when an image was formed by using the active ray curable ink of the present invention according to the method of the present invention, it was possible to obtain an image excellent in all of wettability, adhesiveness, and curability.

In particular, in Sample Nos. 13, 15 to 19, 21 to 25, 27 to 31, and 33 to 36 in which an image was formed by an ink using, as a gelling agent, at least one kind of compound among compounds represented by General Formulas (G1) and (G2), adhesiveness in 65.0% (13/20) of images was scored as 25 (perfect score).

Further, in Sample Nos. 15 to 18, 21 to 24, 27 to 30, and 33 to 36 in which an image was formed by an ink using, as a photopolymerizable compound contained in the first ink, 10 to 40% by mass of (meth)acrylate compound, which has a molecular weight of 280 to 1500 and a C log P value of 4.0 to 7.0, with respect to the entire mass of the first ink, adhesiveness in 81.3% (13/16) of images was scored as 25 (perfect score).

On the other hand, when the first active ray curable ink contained 5% by mass or more of the gelling agent (Sample Nos. 1 and 2), excellent results in all of wettability, adhesiveness, and curability of the second ink were not obtained. The reason for this is considered that, since the amount of the gelling agent contained in the first ink was excessively large, the gelling agent in the vicinity of the surface was not sufficiently compatible with the photopolymerizable compound even by heating.

When the second active ray curable ink contained the gelling agent (Sample No. 3), adhesiveness and curability of the second active ray curable ink were lowered. The reason for this is considered that, since the second ink contains 5.0% by mass or more of the gelling agent, adhesiveness with the first ink was deteriorated by the excessively precipitated gelling agent, and thus curability was deteriorated.

When heating was not performed by irradiation with an infrared ray before the second ink was cured (Sample Nos. 4 to 12), wettability and adhesiveness of the ink were not sufficient. The reason for this is considered that the gelling agent precipitated in the vicinity of the surface of the first ink was not compatible with the photopolymerizable compound, and thus the attachment of the second ink was inhibited.

Even when heating was performed before the image formation by using the second ink, similarly to a case where heating was formed after the image formation by using the second ink, it was possible to obtain an image excellent in all of wettability, adhesiveness, and curability (Sample Nos. 43 to 54).

INDUSTRIAL APPLICABILITY

The method of the present invention is suitable for forming an image which is excellent in adherability of the first ink and the second ink.

The present application claims the priority based on Japanese Patent Application No. 2014-045293 filed on Mar. 7, 2014. The matters described in the specification and drawings of the relevant application are all incorporated herein by reference.

REFERENCE SIGNS LIST 10, 20 INKJET RECORDING APPARATUS
12 RECORDING MEDIUM
14, 24 INKJET RECORDING HEAD
16, 26 HEAD CARRIAGE
18, 28 FIRST ACTIVE RAY IRRADIATION UNIT
19 HEATING UNIT
27 GUIDE UNIT
40 SECOND ACTIVE RAY CURABLE INK DISCHARGING UNIT
60 INFRARED IRRADIATION UNIT
70 SECOND ACTIVE RAY IRRADIATION UNIT

The invention claimed is:

1. An image forming method comprising:
a first step of applying a first active ray curable ink, which contains a colorant, a gelling agent, a photopolymerizable compound, and a photoinitiator and undergoes temperature-induced reversible sol-gel phase transition, to a recording medium;
a second step of irradiating the first ink with an active ray to cure and fix the first ink;
a third step of additionally applying a second active ray curable ink which contains a photopolymerizable compound and a photoinitiator; and
a fourth step of irradiating the second ink with an active ray, in this order, wherein
the first active ray curable ink contains 0.5 to 5.0% by mass of the gelling agent with respect to the entire mass of the ink,
the photopolymerizable compound in the first ink contains 10 to 40% by mass of a (meth)acrylate compound, which has a molecular weight of 280 to 1500 and a C log P value of 4.0 to 7.0, with respect to the entire mass of the first ink,
the second active ray curable ink contains less than 5.0% by mass of the gelling agent with respect to the entire mass of the ink, and
the fourth step is performed in a state where the cured and fixed first ink is heated.

2. The method according to claim 1, wherein the gelling agent contained in the first ink or the second ink is at least one kind of compound among compounds represented by the following General Formulas (G1) and (G2):

$$R1\text{-}CO\text{-}R2 \qquad \text{General Formula (G1):}$$

$$R3\text{-}COO\text{-}R4 \qquad \text{General Formula (G2):}$$

wherein R1 to R4 each independently represent a hydrocarbon group having a straight-chain moiety with 12 or more carbon atoms.

3. The method according to claim 1, wherein in the second step, the irradiation with the active ray is performed by using an LED light source having a maximum illuminance in a wavelength range of 385 to 410 nm, and the maximum illuminance of the surface of the applied first ink is 0.5 to 5.0 w/cm2.

4. The method according to claim 1, wherein the first step is performed by discharging the first active ray curable ink from a nozzle of an inkjet recording head onto the recording medium.

5. The method according to claim 4, wherein the first step is performed in a single pass manner.

6. The method according to claim 1, wherein at least the second step is performed while the recording medium is moved at a linear speed of 50 to 120 m/min.

7. The method according to claim 1, wherein the second ink does not substantially contain a colorant.

8. The method according to claim 1, wherein the second ink contains a white pigment.

9. The method according to claim 1, further comprising a step of heating the cured and fixed first ink.

10. The method according to claim 9, wherein the heating step is performed between the second step and the third step.

11. The method according to claim 9, wherein the heating step is performed between the third step and the fourth step.

12. The method according to claim 1, wherein the step of heating the cured and fixed first ink is a step of irradiating the surface of the cured and fixed first ink with an infrared ray.

13. The method according to claim 2, wherein in the second step, the irradiation with the active ray is performed by using an LED light source having a maximum illuminance in a wavelength range of 385 to 410 nm, and the maximum illuminance of the surface of the applied first ink is 0.5 to 5.0 w/cm2.

14. The method according to claim 2, wherein the first step is performed by discharging the first active ray curable ink from a nozzle of an inkjet recording head onto the recording medium.

15. The method according to claim 2, wherein at least the second step is performed while the recording medium is moved at a linear speed of 50 to 120 m/min.

16. The method according to claim 2, wherein the second ink does not substantially contain a colorant.

17. The method according to claim 2, wherein the second ink contains a white pigment.

18. The method according to claim 2, further comprising a step of heating the cured and fixed first ink.

\* \* \* \* \*